United States Patent
Kondoh et al.

[11] Patent Number: 6,115,091
[45] Date of Patent: Sep. 5, 2000

[54] LIQUID CRYSTAL DEVICE WITH ADJUSTABLE LIGHT THROUGHPUT

[75] Inventors: Shinya Kondoh; Toshiaki Fukushima; Mie Ohara, all of Tokorozawa, Japan

[73] Assignee: Citizen Watch Co., Ltd., Tokyo, Japan

[21] Appl. No.: 09/155,054

[22] PCT Filed: Mar. 26, 1997

[86] PCT No.: PCT/JP97/01022

§ 371 Date: Sep. 28, 1998

§ 102(e) Date: Sep. 28, 1998

[87] PCT Pub. No.: WO97/37270

PCT Pub. Date: Oct. 9, 1997

[30] Foreign Application Priority Data

Mar. 29, 1996 [JP] Japan .................................... 8-075499
Apr. 22, 1996 [JP] Japan .................................... 8-099982
Jun. 17, 1996 [JP] Japan .................................... 8-155094

[51] Int. Cl.[7] .................................................. G02F 1/133
[52] U.S. Cl. ............................ 349/72; 349/100; 349/161
[58] Field of Search .............................. 349/72, 65, 100, 349/99, 161, 33; 345/102, 97

[56] References Cited

U.S. PATENT DOCUMENTS

| | | | |
|---|---|---|---|
| 4,941,736 | 7/1990 | Taniguchi et al. | 349/100 |
| 5,109,291 | 4/1992 | Inaba | 359/56 |
| 5,293,534 | 3/1994 | Mihara | 359/84 |
| 5,623,351 | 4/1997 | Kondoh | 349/100 |
| 5,638,143 | 6/1997 | Hughes et al. | 349/100 |

FOREIGN PATENT DOCUMENTS

| | | |
|---|---|---|
| 62-286094 | 12/1987 | Japan . |
| 64-6927 | 1/1989 | Japan . |
| 3-102317 | 4/1991 | Japan . |
| 4-14013 | 1/1992 | Japan . |
| 5-19261 | 1/1993 | Japan . |
| 5-303081 | 11/1993 | Japan . |
| 6-67159 | 3/1994 | Japan . |
| 6-175589 | 6/1994 | Japan . |
| 7-311373 | 11/1995 | Japan . |

*Primary Examiner*—James A. Dudek
*Attorney, Agent, or Firm*—Finnegan, Henderson, Farabow, Garrett & Dunner, L.L.P.

[57] ABSTRACT

The present invention relates to a liquid crystal unit having a liquid crystal panel (2) that has an antiferroelectric liquid crystal or ferroelectric liquid crystal sandwiched between a pair of substrates (23a, 23b), and a backlight (1) for illuminating the liquid crystal panel (10). For improving image quality of a display screen, an amount of light output from the backlight is adjusted according to a change in conical angle, a change in temperature of use of the liquid crystal panel (10) or temperature at which the liquid crystal panel is usable, a change in polarization reverse current, a change in transmission light, or the like. An angle at which two sheet polarizers (21a, 21b) are arranged is adjusted according to the change. According to the present invention, a display screen with good image quality can be provided.

26 Claims, 23 Drawing Sheets

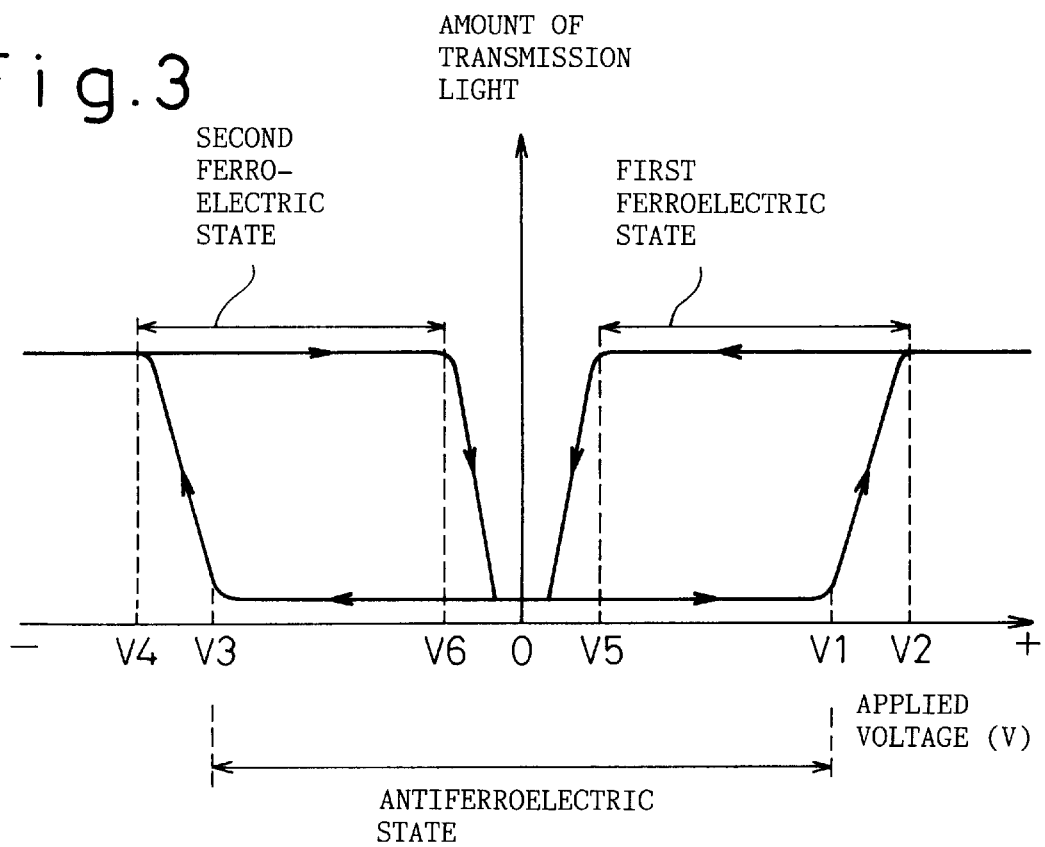
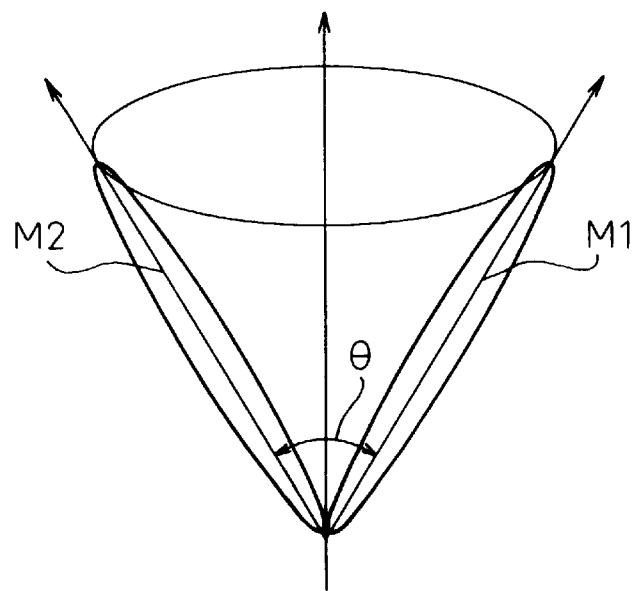

LIQUID CRYSTAL DEVICE WITH ADJUSTABLE LIGHT THROUGHPUT

TECHNICAL FIELD

The present invention relates to a liquid crystal display. More particularly, the first aspect of the present invention is concerned with an antiferroelectric liquid crystal panel having an antiferroelectric liquid crystal as a liquid crystal layer, and a backlight for illuminating the panel. The second aspect of the present invention is concerned with adjustment of an angle of rotation by which sheet polarizers included in a liquid crystal panel, which has an antiferroelectric liquid crystal or ferroelectric liquid crystal as a liquid crystal layer, are turned. The third aspect of the present invention is concerned with arrangement of sheet polarizers, and with a ferroelectric liquid crystal panel having a ferroelectric liquid crystal as a liquid crystal layer and a backlight for illuminating the panel.

1. Background Art

In general, a liquid crystal is broadly divided into a dielectrically anisotropic type and ferroelectric type in terms of an electro-optic effect (phenomenon where when one aligned state of liquid crystalline molecules is changed into another with application of an electric field, an optical property of a liquid crystal panel is varied to electrically cause light modulation). A typical liquid crystal of the former type is a super-twisted nematic (STN) liquid crystal, and a liquid crystal of the latter type is subdivided into a memory type and non-memory type.

The present invention relates to a liquid crystal display belonging to the latter type. A liquid crystal unit is composed of a liquid crystal panel having an antiferroelectric liquid crystal or ferroelectric liquid crystal as a liquid crystal layer, and a backlight for illuminating the liquid crystal panel. For improving image quality offered by the liquid crystal unit, an amount of light output from the backlight is adjusted according to a change in conical angle, a change in temperature of use or temperature at which the liquid crystal panel is usable, a change in polarization reverse current, or a change in transmitted light. Furthermore, an angle at which two sheet polarizers are arranged is adjusted according to the change.

2. Disclosure of the Invention

The first object of the present invention is to provide an antiferroelectric liquid crystal unit. In the antiferroelectric liquid crystal unit, a change in conical angle, a change in temperature of use or temperature at which a liquid crystal panel is usable, a change in polarization reverse current, or a change in transmitted light may occur in a liquid crystal panel having an antiferroelectric liquid crystal. In this case, an amount of light output from a backlight is adjusted in order to minimize a change in contrast ratio for display, and to prevent a power consumption of the backlight from increasing.

The second object of the present invention is to provide a liquid crystal unit. In the liquid crystal unit, a change in conical angle, a change in temperature of use or temperature at which a liquid crystal is usable, a change in polarization reverse current, or a change in transmission light may occur in a liquid crystal panel having an antiferroelectric liquid crystal or ferroelectric liquid crystal. In this case, an angle at which sheet polarizers are arranged is adjusted in order to attain a maximum contrast ratio.

The third object of the present invention is to provide a ferroelectric liquid crystal unit. In the ferroelectric liquid crystal unit, a change in conical angle, a change in tempera-ture of use or temperature at which a liquid crystal panel is usable, a change in polarization reverse current, or a change in transmission light may occur in a liquid crystal panel having a ferroelectric liquid crystal. In this case, an amount of light output from a backlight is adjusted in order to minimize a change in contrast ratio for display and to prevent the power consumption of the backlight from increasing.

For accomplishing the first object of the present invention, the first aspect of the present invention is realized in the forms described below.

In the first form of the first aspect, the present invention provides an antiferroelectric liquid crystal unit composed of an antiferroelectric liquid crystal panel having an antiferroelectric liquid crystal sandwiched between a pair of substrates, and a backlight for illuminating the antiferroelectric liquid crystal panel.

The antiferroelectric liquid crystal assumes a first ferroelectric state, a second ferroelectric state that is a ferroelectric state resulting from application of a voltage whose polarity is opposite to the polarity of a voltage applied to attain the first ferroelectric state, and an antiferroelectric state.

An amount of light output from the backlight is adjusted according to a change in angle defined between a direction in which the major axis of an average molecule of the antiferroelectric liquid crystal is oriented in the first ferroelectric state, and a direction in which the major axis of the average molecule thereof is oriented in the second ferroelectric state.

In the second form of the first aspect, the present invention provides an antiferroelectric liquid crystal unit composed of an antiferroelectric liquid crystal panel having an antiferroelectric liquid crystal sandwiched between a pair of substrates, and a backlight for illuminating the liquid crystal panel.

The antiferroelectric liquid crystal unit has a structure for adjusting an amount of light output from the backlight according to a change in temperature of use or temperature at which the antiferroelectric liquid crystal panel is usable.

In the third form of the first aspect, the present invention provides an antiferroelectric liquid crystal unit composed of an antiferroelectric liquid crystal panel having an antiferroelectric liquid crystal sandwiched between a pair of substrates, and a backlight for illuminating the liquid crystal panel.

The antiferroelectric liquid crystal unit has a structure for adjusting an amount of light output from the backlight according to a change in polarization reverse current flowing in the antiferroelectric liquid crystal.

In the fourth form of the first aspect, the present invention provides an antiferroelectric liquid crystal unit composed of an antiferroelectric liquid crystal panel having an antiferroelectric liquid crystal sandwiched between a pair of substrates, and a backlight for illuminating the liquid crystal panel.

The antiferroelectric liquid crystal assumes a first ferroelectric state, a second ferroelectric state that is a ferroelectric state resulting from application of a voltage whose polarity is opposite to the polarity of a voltage applied to attain the first ferroelectric state, and an antiferroelectric state.

The antiferroelectric liquid crystal unit comprises: a transmission light sensor for measuring a luminance level of transmission light that has passed through the antiferroelectric liquid crystal panel and has been output from the backlight; and a memory means for storing a correlation between an angle, which is defined by a direction in which the major axis of an average molecule of an antiferroelectric liquid crystal is oriented in the first ferroelectric state, and a direction in which the major axis of the average molecule thereof is oriented in the second ferroelectric state, and a luminance level of transmission light.

Based on the luminance level measured by the transmitted light sensor and the correlation stored in the memory means, an amount of light output from the backlight is adjusted.

For accomplishing the second object of the present invention, the second aspect of the present invention is realized in the forms described below.

In the first form of the second aspect, the present invention provides a liquid crystal panel composed of a liquid crystal, which assumes at least a first ferroelectric state and second ferroelectric state, sandwiched between a pair of substrates, and first and second sheet polarizers.

The first sheet polarizer and second sheet polarizer are arranged to interpose the pair of substrates between them.

A plane of polarization produced by the first sheet polarizer and a plane of polarization produced by the second sheet polarizer are fixed at an angle of substantially 90°.

The first sheet polarizer and second sheet polarizer share the same axis of rotation.

According to a change in angle defined between a direction in which the major axis of an average molecule of the liquid crystal is oriented in the first ferroelectric state, and a direction in which the major axis of the average molecule thereof is oriented in the second ferroelectric state, the first sheet polarizer and second sheet polarizer are turned with the shared axis of rotation as a center.

In the second form of the second aspect, the present invention provides a liquid crystal panel having a liquid crystal, which assumes at least a first ferroelectric state and a second ferroelectric state, sandwiched between a pair of substrates, and a first sheet polarizer and second sheet polarizer.

The first sheet polarizer and second sheet polarizer are arranged to interpose the pair of substrates between them.

The plane of polarization produced by the first sheet polarizer and the plane of polarization produced by the second sheet polarizer are fixed at an angle of substantially 90°.

The first sheet polarizer and second sheet polarizer share the same axis of rotation.

The first sheet polarizer and second sheet polarizer has a structure for adjusting an angle of rotation with the shared axis of rotation as a center according to a change in use temperature or temperature at which the liquid crystal panel is usable.

In the third form of the second aspect, the present invention provides a liquid crystal panel composed of a liquid crystal, which assumes at least a first ferroelectric state and second ferroelectric state, sandwiched between a pair of substrates, and a first sheet polarizer and second sheet polarizer.

The first sheet polarizer and second sheet polarizer are arranged to interpose the pair of substrates between them.

A plane of polarization produced by the first sheet polarizer and a plane of polarization produced by the second sheet polarizer are fixed at an angle of substantially 90°.

The first sheet polarizer and second sheet polarizer share the same axis of rotation.

The first sheet polarizer and second sheet polarizer have a structure for adjusting an angle of rotation with the shared axis of rotation as a center according to a change in polarization reverse current in the liquid crystal.

In the fourth form of the second aspect, the present invention provides a liquid crystal panel composed of a liquid crystal, which assumes at least a first ferroelectric state and second ferroelectric state, sandwiched between a pair of substrates, and a first sheet polarizer and second sheet polarizer.

The first sheet polarizer and second sheet polarizer are arranged to interpose the pair of substrates between them.

A plane of polarization produced by the first sheet polarizer and a plane of polarization produced by the second sheet polarizer are fixed at an angle of substantially 90°.

The first sheet polarizer and second sheet polarizer share the same axis of rotation.

The first sheet polarizer and second sheet polarizer have a structure for adjusting an angle of rotation with the shared axis of rotation as a center according to a change in amount of transmission light in the liquid crystal panel.

For accomplishing the third object of the present invention, the third aspect of the present invention is realized in the forms described below.

In the first form of the third aspect, the present invention provides a liquid crystal panel having a liquid crystal, which assumes at least first and second ferroelectric states, sandwiched between a pair of substrates, having a first sheet polarizer and second sheet polarizer arranged to interpose the pair of substrates between them, and having a plane of polarization produced by the first sheet polarizer and a plane of polarization produced by the second sheet polarizer fixed at an angle of substantially 90°.

Two planes are located at angles that are halves of angles defined by the plane of polarization produced by the first sheet polarizer and the plane of polarization produced by the second sheet polarizer. One of the planes is regarded as a first intermediate plane, and the other thereof is regarded as a second intermediate plane.

The first and second sheet polarizers are arranged so that: a direction in which the major axis of an average molecule of the liquid crystal is oriented in one of the first and second ferroelectric states will always be located between the plane of polarization produced by the first sheet polarizer and the first intermediate plane at a temperature falling within a range of temperature of use within which the liquid crystal panel is usable; and a direction in which the major axis of the average molecule of the liquid crystal is oriented in the other ferroelectric state will always be located between the plane of polarization produced by the second sheet polarizer and the first intermediate plane.

In the second form of the third aspect, the present invention provides a liquid crystal panel having a liquid crystal, which assumes at least first and second ferroelectric states, sandwiched between a pair of substrates, having a first sheet polarizer and second sheet polarizer arranged to interpose the pair of substrates between them, and having a plane of polarization produced by the first sheet polarizer and a plane of polarization produced by the second sheet polarizer fixed at an angle of substantially 90°.

Two planes are located at angles that are halves of angles defined by the plane of polarization produced by the first sheet polarizer and the plane of polarization produced by the second sheet polarizer. One of the planes is regarded as a first intermediate plane, and the other thereof is regarded as a second intermediate plane.

The first and second sheet polarizers are arranged so that: a direction in which the major axis of an average molecule of the liquid crystal is oriented in one of the first and second states will always be located between the plane of polarization produced by the second sheet polarizer and the first intermediate plane at a temperature falling within a range of temperature of use within which the liquid crystal panel is usable; and a direction in which the major axis of the average molecule of the liquid crystal is oriented in the other ferroelectric state will always be located between the plane of polarization produced by the second sheet polarizer and the second intermediate plane.

In the third form of the third aspect, the present invention provides a liquid crystal panel having a liquid crystal, which assumes at least first and second ferroelectric states, sandwiched between a pair of substrates, having a first sheet polarizer and second sheet polarizer arranged to interpose the pair of substrates between them, having the plane of polarization produced by the first sheet polarizer and the plane of polarization produced by the second sheet polarizer fixed at an angle of substantially 90°.

Two planes are located at angles that are halves of angles defined by the plane of polarization produced by the first sheet polarizer and the plane of polarization produced by the second sheet polarizer. One of the planes is regarded as a first intermediate plane, and the other thereof is regarded as a second intermediate plane.

The first and second sheet polarizers are arranged so that: a direction in which the major axis of an average molecule of the liquid crystal is oriented in one of the first and second ferroelectric states will always be located between the plane of polarization produced by the first sheet polarizer and the first intermediate plane at a temperature falling within a range of temperature of use within which the liquid crystal panel is usable; and a direction in which the major axis of the average molecule of the liquid crystal is oriented in the other ferroelectric state will always be located between the plane of polarization produced by the first sheet polarizer and the second intermediate plane.

In the fourth mode of the third aspect, the present invention provides a ferroelectric liquid crystal unit composed of a ferroelectric liquid crystal panel having a ferroelectric liquid crystal sandwiched between a pair of substrates, and a backlight for illuminating the liquid crystal panel.

An amount of light output from the backlight is adjusted according to a change in angle defined between a direction, in which the major axis of an average molecule of the ferroelectric liquid crystal is oriented in one of first and second ferroelectric states, and a direction in which the major axis of the average molecule thereof is oriented in the other ferroelectric state.

In the fifth mode of the third aspect, the present invention provides a ferroelectric liquid crystal unit composed of a ferroelectric liquid crystal panel having a ferroelectric liquid crystal sandwiched between a pair of substrates, and a backlight for illuminating the liquid crystal panel.

The ferroelectric liquid crystal unit has a structure for adjusting an amount of light output from the backlight according to a change in temperature of use or temperature at which the ferroelectric liquid crystal panel is usable.

In the sixth form of the third aspect, the present invention provides a ferroelectric liquid crystal unit composed of a ferroelectric liquid crystal panel having a ferroelectric liquid crystal sandwiched between a pair of substrates, and a backlight for illuminating the liquid crystal panel.

The ferroelectric liquid crystal unit has a structure for adjusting an amount of light output from the backlight according to a change in polarization reverse current flowing through the ferroelectric liquid crystal.

In the seventh form of the third aspect, the present invention provides a ferroelectric liquid crystal unit composed of a ferroelectric liquid crystal panel having a ferroelectric liquid crystal sandwiched between a pair of substrates, and a backlight for illuminating the ferroelectric liquid crystal panel.

The ferroelectric liquid crystal unit comprises a transmission light sensor for measuring a luminance level of transmission light that has been output from the backlight and has passed through the ferroelectric liquid crystal panel; and a memory means for storing a correlation between an angle, which is defined by a direction in which the major axis of an average molecule of the ferroelectric liquid crystal is oriented in the first ferroelectric state and a direction in which the major axis of the average molecule thereof is oriented in the second ferroelectric state, and a luminance level of transmission light.

Based on the luminance level measured by the transmission light sensor and the correlation stored in the memory means, an amount of light output from the backlight is adjusted.

BRIEF DESCRIPTION OF THE DRAWINGS

FIG. 3 is a diagram showing a relationship between an applied voltage and an amount of transmission light in the antiferroelectric liquid crystal panel in accordance with the first aspect;

FIG. 4 is an explanatory diagram showing a conical angle of a molecule of an antiferroelectric liquid crystal;

BEST MODE FOR CARRYING OUT THE INVENTION

Prior to a description of the first aspect of the present invention, a prior art and underlying problems will be described below.

A liquid crystal panel formed using an antiferroelectric liquid crystal has been studied in earnest since disclosure of, for example, Japanese Unexamined Patent Publication No. 2-173724. The patent publication reported that the liquid crystal panel can provide a large angle for a field of view, can respond fast, and can be multiplexed satisfactorily.

Figure 2:
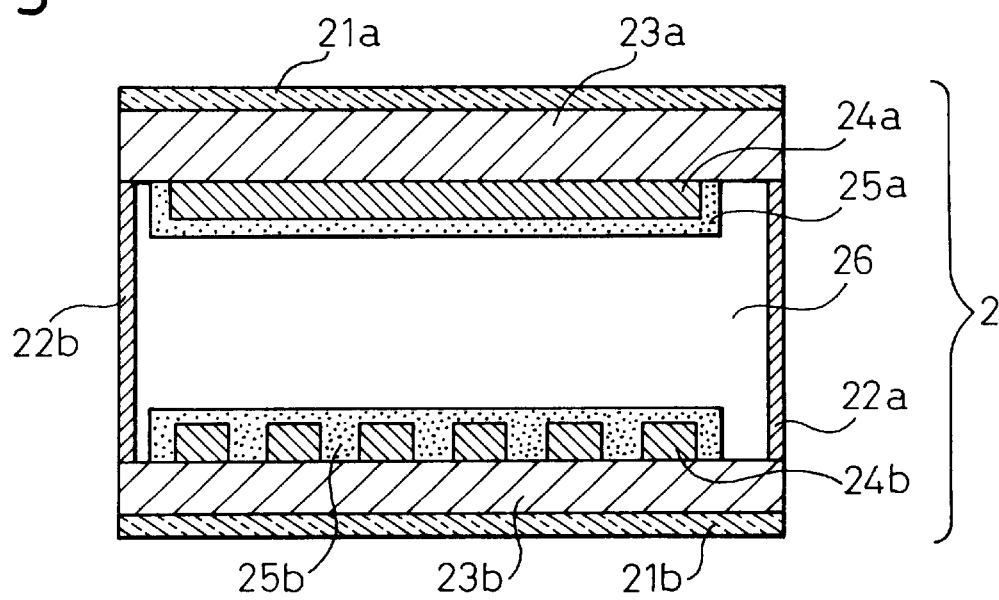
FIG. 2 is a diagram showing the structure of an antiferroelectric liquid crystal panel in accordance with the first aspect.

FIG. 2 is a diagram showing the structure of an antiferroelectric liquid crystal panel of a liquid crystal display having an antiferroelectric liquid crystal. A liquid crystal panel 2 has an antiferroelectric liquid crystal 26 sandwiched between a pair of substrates 23a and 23b. The antiferroelectric liquid crystal 26 is placed between sheet polarizers 21a and 21b that are arranged in the form of cross-nicol. Herein, the sheet polarizers are arranged so that the major axis of an average molecule of the antiferroelectric liquid crystal will be parallel to a plane of polarization, which is produced by either of the sheet polarizers, in the absence of an electric field.

FIG. 3 shows a relationship of an applied voltage to be applied to the antiferroelectric liquid crystal panel having the structure shown in FIG. 2 to an amount of transmission light required by the antiferroelectric liquid crystal panel at that time. The axis of ordinates indicates an amount of transmission light, and the axis of abscissas indicates an applied voltage. The applied voltage is applied with the polarity thereof set to a positive or negative polarity. As illustrated, the antiferroelectric liquid crystal assumes three stable states: an antiferroelectric state in which no light is passed; a first ferroelectric state in which light is transmitted with application of a positive voltage of a certain value or more (+V2); and a second ferroelectric state in which light is transmitted with application of a negative voltage of a certain value or more (−V4).

In general, the antiferroelectric liquid crystal unit has a backlight located on one side of the antiferroelectric liquid crystal panel. When no voltage is applied, the antiferroelectric liquid crystalline molecules are placed in the antiferroelectric state. The major axis of an average molecule is aligned with a plane of polarization produced by a sheet polarizer. Light emanating from the backlight will therefore not be transmitted. Moreover, when a voltage is applied to the antiferroelectric liquid crystal panel, the antiferroelectric liquid crystal is, as shown in FIG. 3, brought to the first or second ferroelectric state according to the polarity of an applied voltage. Accordingly, the major axis of the average molecule varies its direction. The molecules of the antiferroelectric liquid crystal tilt at a certain angle with respect to the plane of polarization. The light emanating from the backlight is therefore transmitted by the antiferroelectric liquid crystal panel. This results in a larger amount of transmission light.

Assume that the antiferroelectric liquid crystal makes a transition to the first or second ferroelectric state, and light is transmitted, that is, white display is carried out. Especially in this case, an amount of transmission light is, as shown in FIG. 4, determined with an angle (referred to as a conical angle) (θ) between a direction M1 in which the major axis of an average molecule of the antiferroelectric liquid crystal is oriented in the first ferroelectric state, and a direction M2 in which the major axis of the average molecule is oriented in the second ferroelectric state. As the conical angle gets larger to approach 90°, the amount of transmission light required for white display increases. By contrast, when the conical angle gets smaller, the amount of transmission light required for white display decreases.

Figure 5:
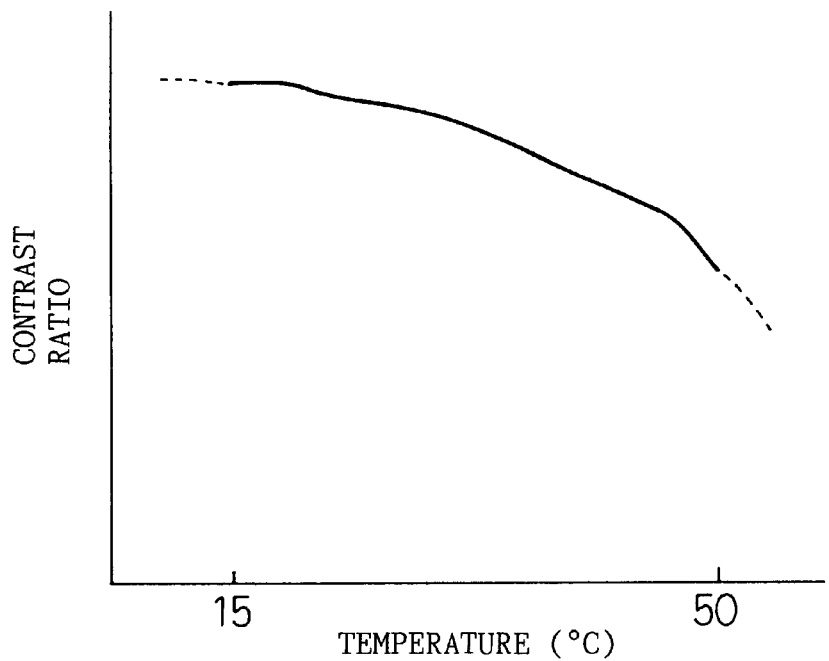
FIG. 5 is a graph indicating a relationship of a contrast ratio for display of an antiferroelectric liquid crystal unit to a temperature.

However, the conical angle of an antiferroelectric liquid crystalline molecule is not always constant. The conical angle depends greatly on, for example, a use temperature, that is, a temperature at which the antiferroelectric liquid crystal unit is driven to become usable for display (that is, an ambient temperature at which the liquid crystal device is usable). In FIG. 5, the axis of ordinates indicates a contrast ratio for display (amount of transmission light for white display/amount of transmission light for black display), and the axis of abscissas indicates the use temperature. For this graph, the temperature of use is varied within a range of temperature of use, that is, a range from 15° C. to 50° C. within which the antiferroelectric liquid crystal is usually used. The contrast ratio for display of the antiferroelectric liquid crystal unit is measured at each temperature of use. As illustrated, as the temperature of use rises, the contrast ratio for display decreases.

Figure 6:
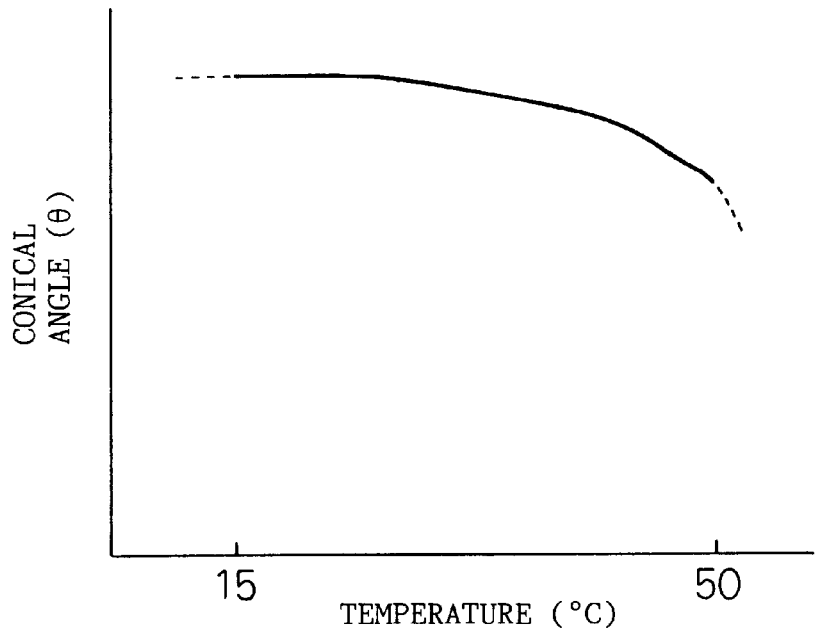
FIG. 6 is a graph indicating a relationship of the temperature of the antiferroelectric liquid crystal panel to a conical angle.

On the other hand, in FIG. 6, the axis of ordinates indicates the conical angle, and the axis of abscissas indicates the temperature of use. As illustrated, as the temperature of use rises, the conical angle decreases. This relationship agrees with the relationship shown in FIG. 5. That is to say, as the temperature rises of use, the conical angle decreases, and the tilt of the antiferroelectric liquid crystalline molecules relative to a plane of polarization gets smaller. Consequently, the amount of transmission light decreases. The contrast ratio for display of the antiferroelectric liquid crystal unit is thus deeply temperature-dependent. This poses a problem that the antiferroelectric liquid crystal unit cannot achieve satisfactory display in a use environment suffering from a great temperature change.

For example, Japanese Unexamined Patent Publication No. 7-230079 discloses a technology of stabilizing the temperature of use of an antiferroelectric liquid crystal unit using a heater all the time for improving the efficiency of response at a low temperature. However, this technology is intended to improve the response efficiency of the antiferroelectric liquid crystalline molecules. Nothing is disclosed concerning the temperature-dependency of the conical angle of the antiferroelectric liquid crystalline molecules. Moreover, problems concerning a contrast ratio for display and a change in luminance have not been discussed at all. Furthermore, as mentioned above, the Japanese Unexamined Patent Publication No. 7-230079 is accompanied by an increase in power consumption deriving from the use of the heater.

According to the first aspect of the present invention, an object of the present invention is to solve the foregoing problems, and to provide an antiferroelectric liquid crystal unit in which a change in contrast ratio for display will remain small despite a change in temperature of use, and a power consumption of a backlight will not rise.

Prior to a description of the second aspect of the present invention, a prior art and its underlying problems will be described below.

In the above description, the liquid crystal 26 is an antiferroelectric liquid crystal. According to the second aspect of the present invention, either the antiferroelectric liquid crystal or a ferroelectric liquid crystal can be adopted as the liquid crystal 26. Consequently, the term "liquid crystal" refers to either the antiferroelectric liquid crystal or ferroelectric liquid crystal.

The antiferroelectric liquid crystal panel shown in FIG. 2 will be further described. A spacer used to keep the spacing constant and the liquid crystal 26 are sandwiched between sealing compounds 22a and 22b. A plane of polarization produced by the first sheet polarizer 21a and a plane of polarization produced by the second sheet polarizer 21b lie substantially at an angle of 90°. When a ferroelectric liquid crystal is used as a liquid crystal, a direction in which the major axis of an average molecule is oriented in the first or second ferroelectric state is aligned with either the plane of polarization produced by the first sheet polarizer 21a or second sheet polarizer 21b.

Figure 23A:
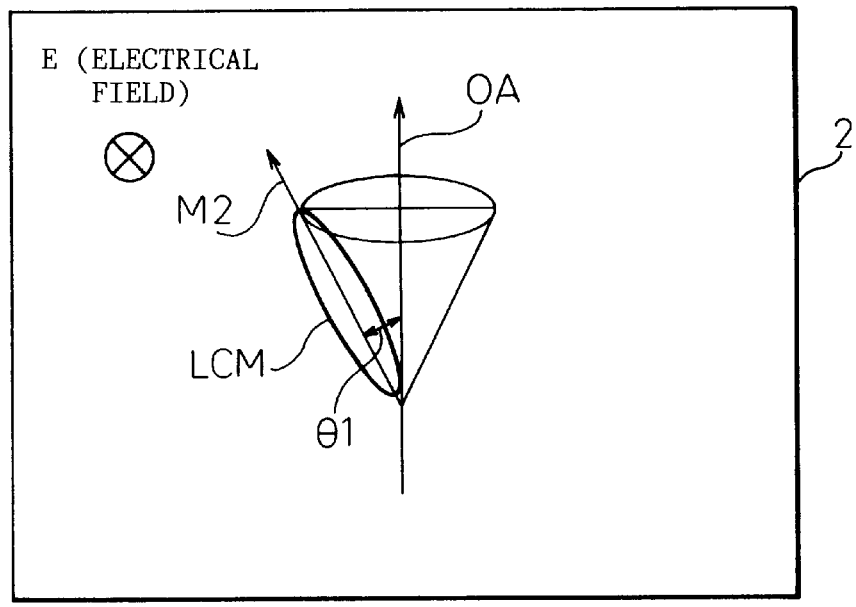
FIGS. 23a and 23b are explanatory diagrams of a liquid crystalline particle in a liquid crystal panel.
Figure 23B:
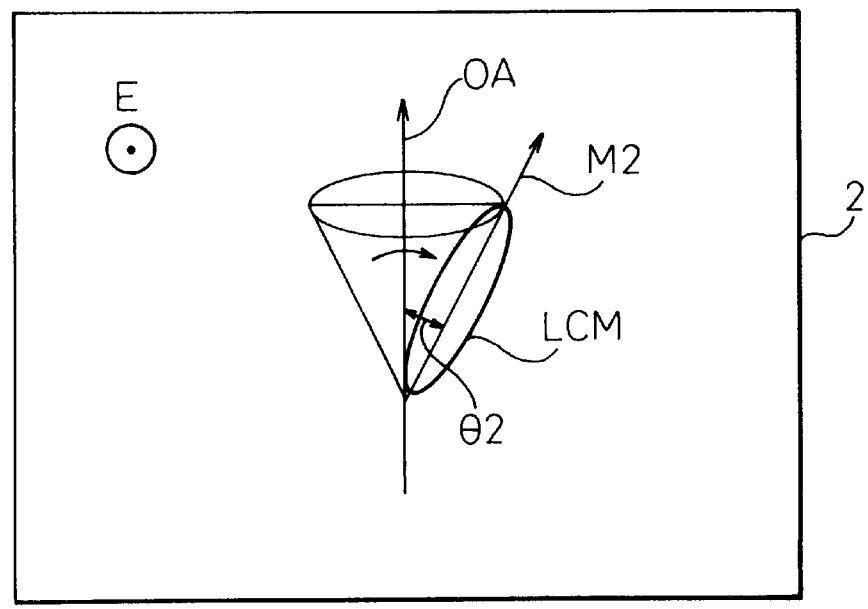

FIGS. 23a and 23b show illustratively a liquid crystalline molecule of the liquid crystal panel 2 seen from above. A direction in which the major axis of an average molecule of a liquid crystal is oriented will be described in conjunction with the drawings. For example, assume that an electric field E is applied in a direction from the face of the drawing (upper glass substrate of the liquid crystal panel) to the back thereof (lower glass substrate thereof) (FIG. 23a). When the liquid crystal is brought to the first ferroelectric state, the major axis of the average liquid crystalline molecule LCM tilts by an angle "θ1" with an axis of orientation OA set by an orientation film, and stays stable in a direction M2. On the other hand, assume that an electric field E is applied in a direction from the back of the drawing to the face thereof (FIG. 23b). When the liquid crystal is brought to the second ferroelectric state, the major axis of the liquid crystalline molecule LCM tilts by an angle of "θ2" clockwise relative to the axis of orientation OA, and stays stable in a direction M2.

A liquid crystalline molecule LCM shifts along the lateral surface of a cone defined by a segment in the direction M of the major axis thereof. Moreover, a sum (θ1+θ2) of the angle θ1 and angle θ2 refers to an angle between the direction in which the major axis of the average molecule of the liquid crystal is oriented in the first ferroelectric state and the direction in which the major axis thereof is oriented in the second ferroelectric state, that is, a central angle θ (that is, a conical angle) of a cone.

Now, a state of a ferroelectric liquid crystal in which the major axis of an average molecule is oriented in the direction shown in FIG. 23a is referred to as the first ferroelectric state. A state thereof in which the major axis of the average molecule is oriented in the direction shown in FIG. 23b is referred to as the second ferroelectric state. Moreover, even when the liquid crystal is an antiferroelectric liquid crystal, the major axis of the average molecule allegedly shifts over the lateral surface of a cone. The antiferroelectric liquid crystal assumes, as mentioned previously, an antiferroelectric state in addition to the first ferroelectric state and second ferroelectric state. In the antiferroelectric state, the major axis of the average molecule is oriented alternately in the directions shown in FIGS. 23a and 23b in the absence of an electric field. A mean direction of all directions in which the major axis of the average molecule is oriented is aligned with the axis of orientation OA.

Figure 24:
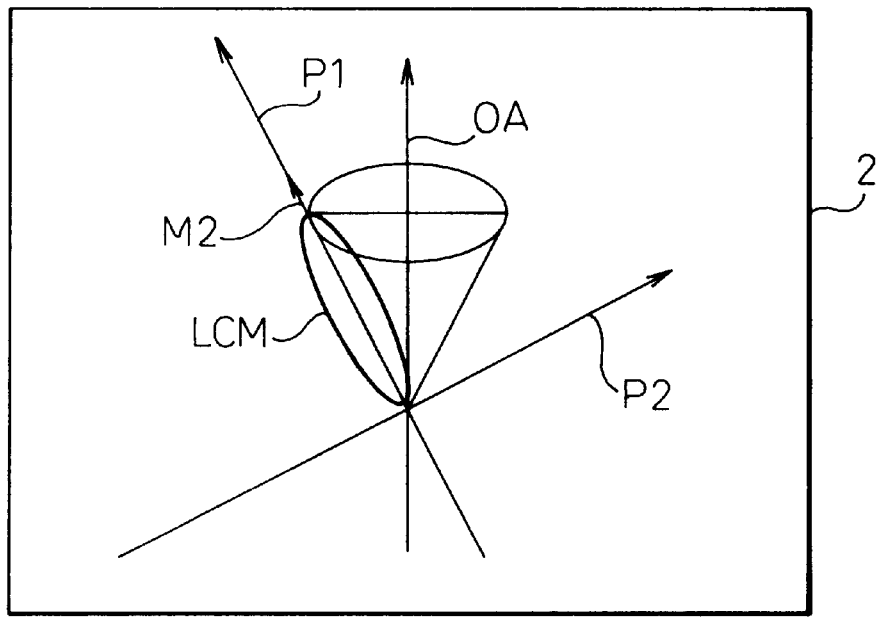
FIG. 24 is an explanatory diagram showing a relationship of a plane of polarization produced by a sheet polarizer to the optical axis of a liquid crystal panel in accordance with the second aspect.

FIG. 24 shows an example of a positional relationship between the major axis of a liquid crystalline molecule and a plane of polarization produced by a sheet polarizer.

This example is concerned with a ferroelectric liquid crystal. In general, when a ferroelectric liquid crystal is employed, either of a plane of polarization P1 produced by the first sheet polarizer and a plane of polarization P2 produced by the second sheet polarizer is aligned with the direction M2 in which the major axis of a molecule is oriented in the first or second ferroelectric state (in this example, the direction M2 is aligned with the plane of polarization P1). In this case, the plane of polarization P1 produced by the first sheet polarizer and the plane of polarization P2 produced by the second sheet polarizer lie at an angle of substantially 90°. This arrangement leads to a minimum amount of transmission light required for dark display. When the orientation of an electric field E is reversed, a liquid crystalline molecule LCM moves with the axis of orientation OA as an axis of symmetry. This results in a maximum amount of transmission light.

Figure 25:
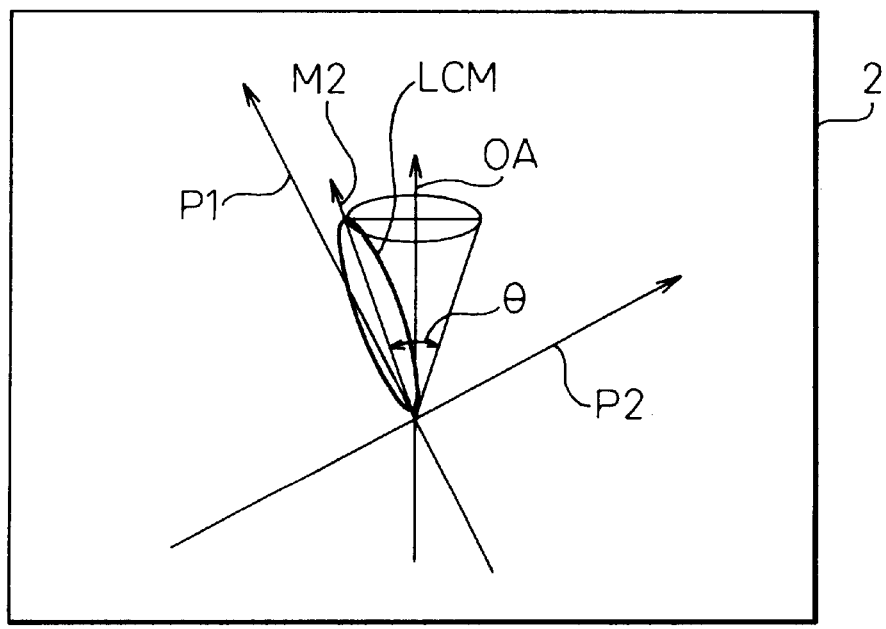
FIG. 25 is an explanatory diagram showing a misalignment between the plane of polarization produced by the sheet polarizer and the optical axis of the liquid crystal panel which occur after a temperature has changed.

Problems underlying a prior art will be described in conjunction with FIGS. 25, 26, and 27. Conventionally, the first sheet polarizer and second sheet polarizer are fixed to glass substrates using an adhesive or the like. However, a temperature observed when the sheet polarizers of a liquid crystal unit are assembled or a temperature observed when an angle at which the sheet polarizers are bonded is determined may be different from a temperature at the time of use. In this case, an angle between the direction M2 of the major axis of a liquid crystalline molecule LCM and the axis of orientation OA (angle θ1 or θ2) changes. The direction M2 in which the major axis of a molecule is, as shown in FIG. 25, aligned with the plane of polarization P1 produced by the sheet polarizer. In the words, since the conical angle θ of a liquid crystalline molecule varies depending on a temperature of use, the plane of polarization produced by the sheet polarizer that has just been placed and the direction in which the major axis of the molecule is oriented are misaligned mutually.

Figure 26:
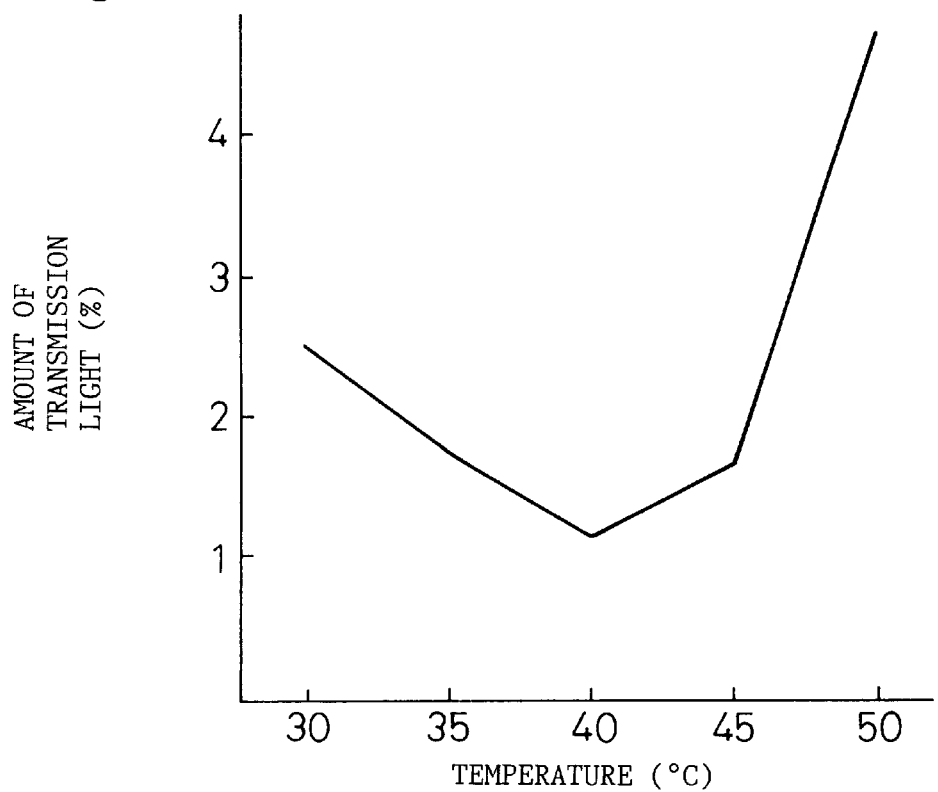
FIG. 26 is a graph indicating amounts of transmission light required for dark display of a conventional liquid crystal panel in relation to temperatures.
Figure 27:
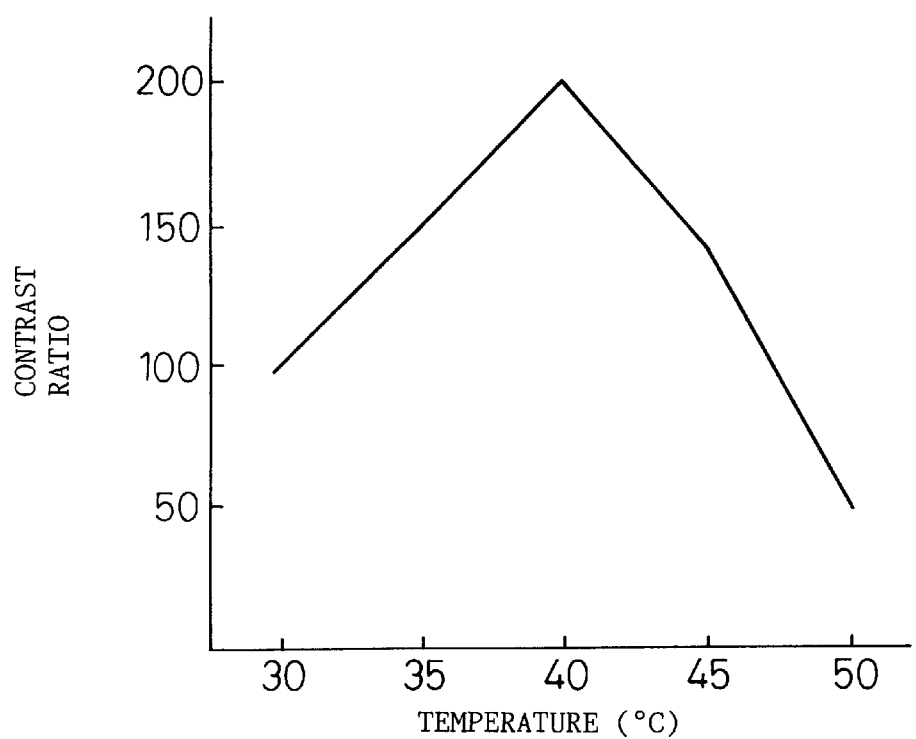
FIG. 27 is a graph indicating a relationship of a contrast ratio for display of the conventional liquid crystal panel to a temperature.

In FIG. 26, the axis of ordinates indicates an amount of transmission light, and the axis of abscissas indicates a temperature of use. This graph is concerned with a sheet polarizer bonded to a glass substrate so that the direction M2 in which the major axis of a liquid crystalline molecule LCM is oriented in the first ferroelectric state will be aligned with the plane of polarization P1 produced by the sheet polarizer. As seen from the graph, the amount of transmission light required for dark display at a temperature falling within a range of temperature of use varies greatly. An amount of transmission light observed at a temperature of use of 40° C. is a minimum value. FIG. 27 indicates a ratio of an amount of transmission light required for white display to an amount of transmission light required for black display as a contrast ratio for display. A change in temperature is reversed at 40°. This leads to a decrease in contrast ratio for display. The above description is concerned with a ferroelectric liquid crystal. The same applies to an antiferroelectric liquid crystal.

According to the second aspect of the present invention, an object of the present invention is to provide a liquid crystal unit capable of offering a maximum contrast ratio even when a conical angle of a liquid crystalline molecule varies with a change in temperature occurring at a temperature that falls within a range of temperatures of use.

Prior to a description of the third aspect of the present invention, a prior art and underlying problems will be described below.

As mentioned above, a ferroelectric liquid crystal is generally known as a liquid crystal that assumes first and second ferroelectric states. A ferroelectric liquid crystal panel having the ferroelectric liquid crystal has been studied in earnest since it was revealed by Clerk et al. in U.S. Pat. No. 4,367,924. The report reads that the ferroelectric liquid crystal panel exerts a memory effect and responds at a high speed, and the ferroelectric liquid crystal panel can be multiplexed satisfactorily.

A liquid crystalline molecule of a ferroelectric liquid crystal moves, as mentioned previously, over the lateral surface of a cone according to a change in applied electric field. In other words, a ferroelectric liquid crystalline molecule is switched from one state to another or moved over the lateral surface only when a given pulsating wave is applied to the liquid crystalline molecule. At this time, a product of the pulse duration of the pulsating wave by a voltage is equal to or larger than a threshold voltage. When an applied voltage has an opposite polarity, the first or second of the two ferroelectric states is selected.

Figure 31:
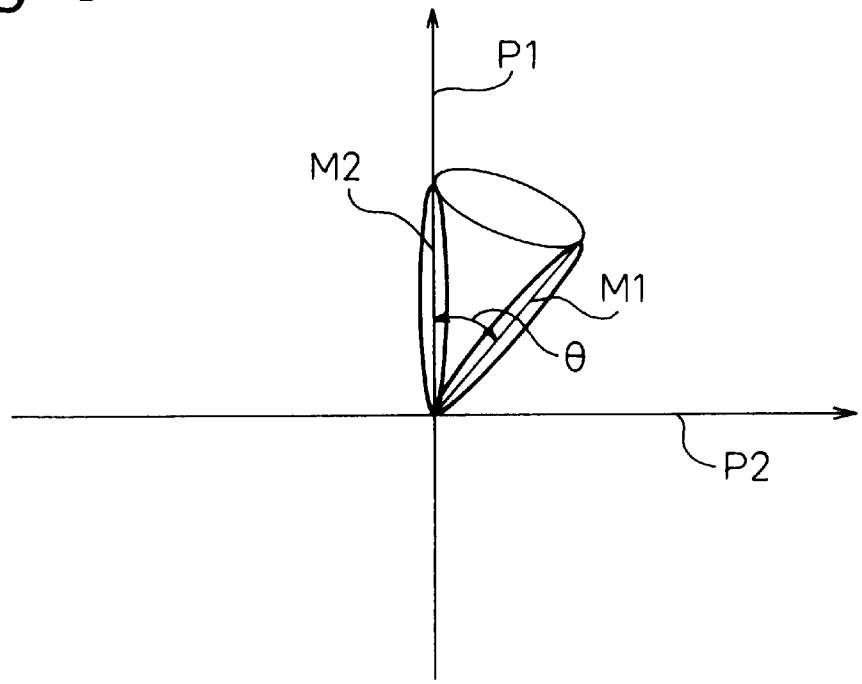
FIG. 31 is an explanatory diagram (No. 1) showing a lane of polarization produced by a conventional sheet polarizer and the major axis of an average molecule of a liquid crystal.

In FIG. 31, a ferroelectric liquid crystal is adopted as a liquid crystal. As already described in conjunction with FIGS. 24 and 25, sheet polarizers are arranged so that the direction M2 in which the major axis of an average molecule of the liquid crystal is oriented in the second ferroelectric state will be aligned with the plane of polarization P produced by one of the sheet polarizers. When liquid crystal molecules are brought to the second ferroelectric state, transmission light does not pass through a liquid crystal panel. The liquid crystal panel therefore appears in black. When the liquid crystalline molecules are brought to the first ferroelectric state M1, transmission light passes. The panel therefore appears in white.

However, as mentioned previously, a conical angle (θ) defined between a direction in which the major axis of an average molecule of a liquid crystal is oriented in the first ferroelectric state and a direction in which the major axis thereof is oriented in the second ferroelectric state changes with a temperature. A temperature of use of a liquid crystal panel is not always constant. Consequently, the direction in which the major axis of the average molecule of the liquid crystal is oriented in the first or second ferroelectric state changes with the temperature of use. An amount of transmission light required by a liquid crystal panel having a ferroelectric liquid crystal changes with the use temperature irrespective of whether white display or black display is under way. This poses a problem that a contrast ratio for display that is a ratio of an amount of transmission light for white display to an amount of transmission light for black display changes with the use temperature.

Figure 32:
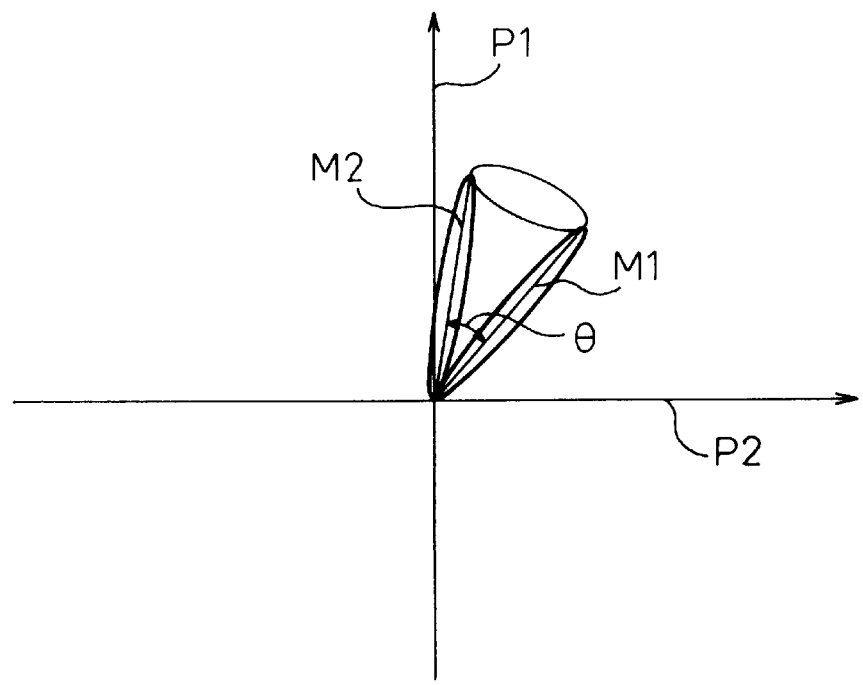
FIG. 32 is an explanatory diagram (No. 2) showing the plane of polarization produced by the conventional sheet polarizer and the major axis of the average molecule of the liquid crystal.
Figure 33:
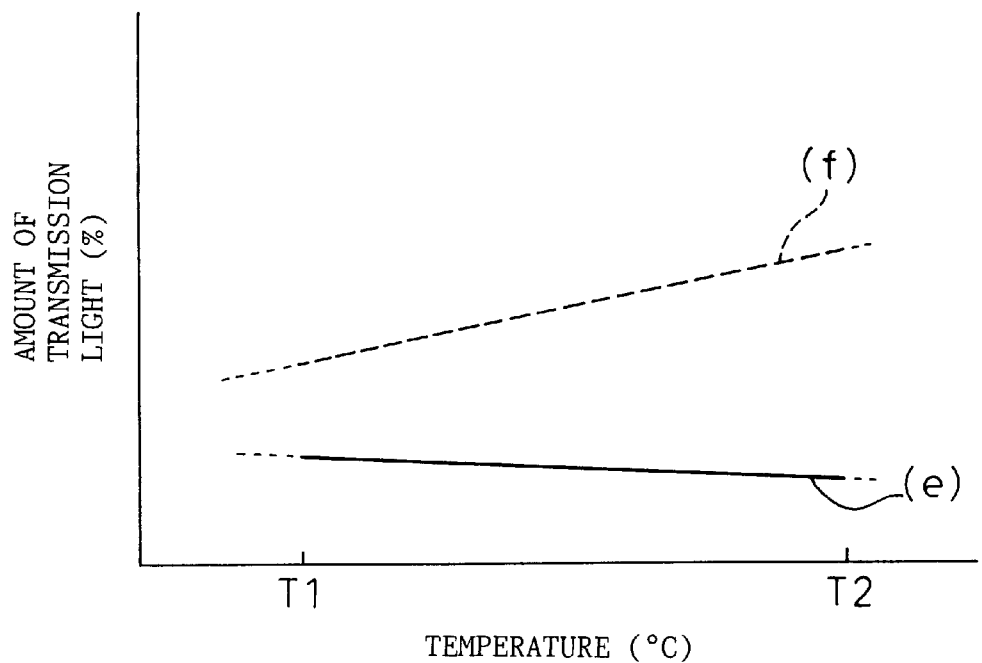
FIG. 33 is a graph showing amounts of transmission light required for white display and black display respectively in relation to temperatures of the conventional liquid crystal panel.
Figure 34:
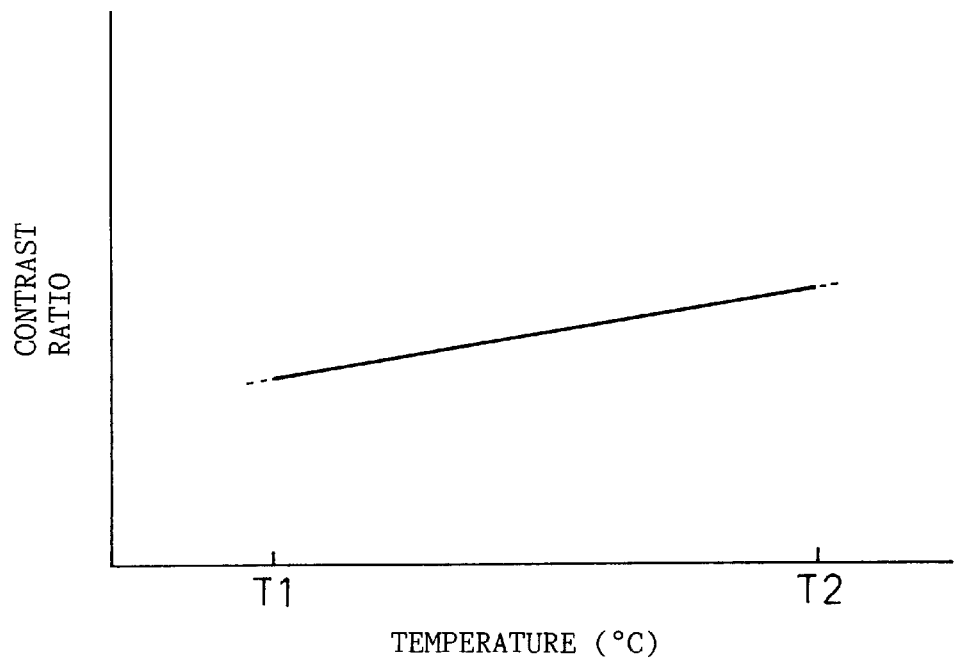
FIG. 34 is a graph indicating a relationship of a contrast ratio for display to a temperature of the conventional liquid crystal panel.

For example, assume that the temperature of use has a maximum value. The direction in which the major axis of an average molecule of a ferroelectric liquid crystal is oriented in one of the two ferroelectric states is aligned with a plane of polarization produced by one sheet polarizer. That is to say, sheet polarizers are arranged so that a state shown in FIG. 31 will be established. Thereafter, when the temperature of use decreases, the conical angle becomes smaller. The direction in which the major axis of an average molecule of a ferroelectric liquid crystal is oriented changes from the direction shown in FIG. 31 to the one shown in FIG. 32. FIG. 33 graphically shows the results of measuring an amount of transmission light required for white display and an amount of transmission light required for black display at a temperature falling within a range of temperature of use (T1 denotes a minimum temperature of use, and T2 denotes a maximum use temperature). As shown in FIG. 33, the amount of transmission light for black display (e) increases (solid line) with a drop in temperature of use. The amount of transmission light for white display (f) decreases (dashed line) with a drop in temperature of use. The contrast ratio for display therefore varies depending on the temperature of use as shown in FIG. 32. When this ferroelectric liquid crystal panel is used for display, the contrast ratio varies depending on the temperature of use. This poses a problem of impaired display quality.

Problems underlying the Japanese Unexamined Patent Publication No. 7-230079 are identical to those accompanying the first aspect of the present invention, and also underlie the third aspect thereof. The literature neither refers to the temperature-dependency of the conical angle nor discusses a problem on a change in contrast ratio or luminance. Moreover, like the first aspect, there are a problem on use of a heater, a problem on properties to be maintained at a low temperature, and a problem on an increase in power consumption at a high temperature.

According to the third aspect of the present invention, an object of the present invention is to provide a ferroelectric liquid crystal unit in which even when a temperature of use of a liquid crystal panel having a ferroelectric liquid crystal changes, a change in contrast ratio for display will be limited, and in which a power consumption required by a backlight will not increase.

The present invention will be described below.

To begin with, embodiments of the first aspect of the present invention will be described below.

As mentioned previously, when an antiferroelectric liquid crystal panel having the structure shown in FIG. 2 appears in white, an amount of transmission light depends on a conical angle of a ferroelectric liquid crystal molecule. A maximum value of the conical angle is substantially 90°. As the conical angle decreases, the amount of transmission light decreases. However, when the panel appears in black, the amount of transmission light remains constant but does not depend on the conical angle. Ideally, the amount of transmission light is zero. Consequently, when the conical angle is held constant, the amount of light transmitted for white display is held constant all the time. High-quality display is enabled.

The conical angle depends on a temperature. For example, when an antiferroelectric liquid crystal is heated, the antiferroelectric liquid crystal makes a transition to an SmA phase depending on the ferroelectric liquid crystal phase or material thereof. At a transition temperature or a temperature at which the ferroelectric liquid crystal phase or SmA phase appears, the conical angle is minimized. As the temperature gets lower than the transition temperature, the conical angle increases. The amount of transmission light for white display gets smaller with a higher temperature. As the temperature recedes from the transition temperature or gets lower, the amount of transmission light for white display increases.

A contrast ratio for display permitted by an antiferroelectric liquid crystal unit used for display is a ratio of an amount of transmission light for white display to an amount of transmission light for black display. The contrast ratio therefore changes with a change in amount of transmission light for white display. To be more specific, when the temperature of an antiferroelectric liquid crystal is equal to the transition temperature, the contrast ratio for display has a minimum value. As the temperature of the antiferroelectric liquid crystal changes from the transition temperature to a lower temperature, the contrast ratio for display increases.

A change in contrast ratio for display is a change in amount of transmission light for white. A change in contrast ratio for display can therefor be avoided by compensating for the magnitude of the change. The amount of transmission light for white can be adjusted by varying an amount of light that falls on an antiferroelectric liquid crystal panel and is output from a backlight. In a antiferroelectric liquid crystal panel having the structure shown in FIG. 2, sheet polarizers are arranged so that planes of polarization produced thereby will lie at an angle of substantially 90°, and the plane of polarization produced by one of the sheet polarizers will be aligned with the direction in which the major axis of an average molecule of an antiferroelectric liquid crystal is oriented in an antiferroelectric state. When an amount of light output from the backlight is maximized at an uppermost temperature of use, a change in contrast ratio for display dependent on a temperature can be prevented. When the amount of light output from the backlight is minimized at a lowermost temperature of use, the change in contrast ratio for display dependent on a temperature can be prevented.

Figure 7:
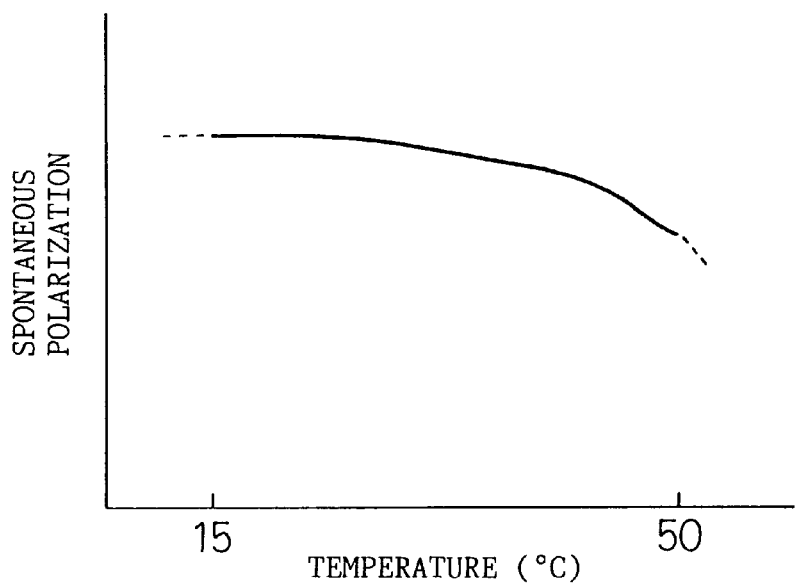
FIG. 7 is a graph indicating a relationship of the temperature of the antiferroelectric liquid crystal panel to a spontaneous polarization.

Moreover, an antiferroelectric liquid crystal possesses a spontaneous polarization. When antiferroelectric liquid crystalline molecules are reversed from a ferroelectric state to an antiferroelectric state or vice versa, a polarization reverse current flows. The polarization reverse current is directly proportional to the magnitude of the spontaneous polarization. The spontaneous polarization of the antiferroelectric liquid crystal varies, as shown in FIG. 7, depending on a change in use temperature. In FIG. 7, the axis of ordinates indicates the spontaneous polarization, and the axis of abscissas indicates the use temperature.

The spontaneous polarization can be estimated based on the polarization reverse current flowing through pixels in a liquid crystal. The temperature of an antiferroelectric liquid crystal panel may not be actually measured. As long as the polarization reverse current can be measured, the temperature of the antiferroelectric liquid crystal panel can be estimated. The magnitude of a change in conical angle can be calculated. Consequently, an amount of light output from a backlight can be adjusted based on a change in polarization reverse current. An electrode on which a polarization reverse current is measured is formed on a substrate according to the same procedure as a procedure of forming electrodes used as pixels. This facilitates measuring of the polarization reverse current.

A transmission light sensor may be included for measuring a luminance level of transmission light output from the backlight and passed through the antiferroelectric liquid crystal panel. Besides, a memory may be included for storing a correlation between a conical angle and a luminance level of transmission light. In this case, an amount of light output from the backlight can be adjusted without the necessity of measuring the temperature of the antiferroelectric liquid crystal panel or a polarization reverse current. In other words, before the antiferroelectric liquid crystal panel is actually activated, a correlation between a luminance level detected by the transmission light sensor and a conical angle of an antiferroelectric liquid crystalline molecule is checked. The correlation is stored in the memory. When display is carried out actually, the amount of light output from the backlight is adjusted based on the luminance level detected by the transmission light sensor and the correlation stored in the memory. Light is then re-output from the backlight.

An embodiment of the first aspect will be described in conjunction with the drawings. FIG. 2 is a diagram showing the structure of an antiferroelectric liquid crystal panel 2 of this embodiment. The antiferroelectric liquid crystal panel 2 of this embodiment is composed of a pair of glass substrates 23a and 23b having an antiferroelectric liquid crystal layer 26 approximately 2 μm thick between them. Display electrodes 24a and 24b are formed on opposed surfaces of the glass substrates. Orientation films 25a and 25b are applied over the display electrodes, and rubbed. A first sheet polarizer 21a is placed on the outer surface of one glass substrate 23a so that a plane of polarization produced by the sheet polarizer will be parallel to a direction in which the major axis of an antiferroelectric liquid crystalline molecule is oriented in the first ferroelectric state. A second sheet polarizer 21b is placed on the outer surface of the other glass substrate 23b so that a plane of polarization produced by the second sheet polarizer 21b will be deviated by substantially 90° from the plane of polarization produced by the first sheet polarizer 21a.

FIG. 6 is a graph indicating a relationship between a use temperature of an antiferroelectric liquid crystal of this embodiment and a conical angle of a molecule thereof. FIG. 6 demonstrates that the conical angle of a molecule of the antiferroelectric liquid crystal gets smaller with an increase in use temperature.

Figure 8:
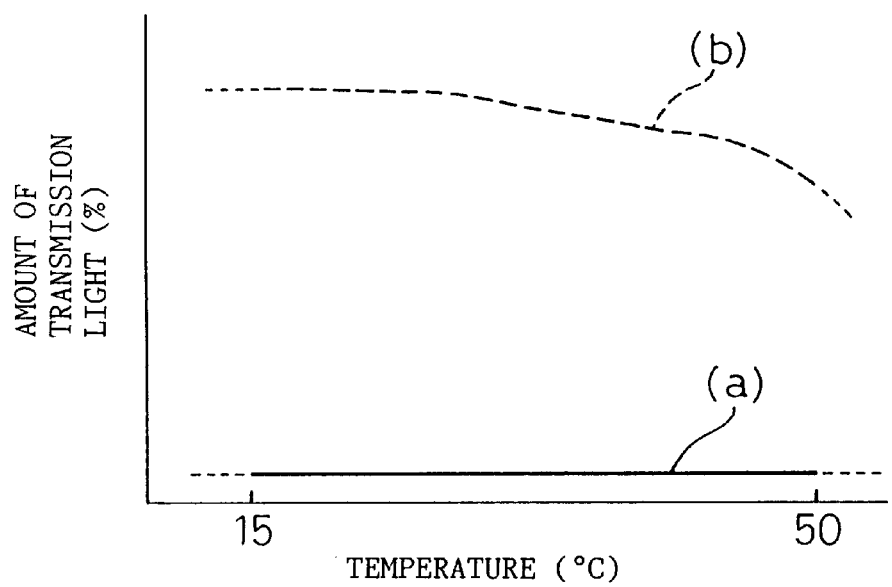
FIG. 8 is a graph indicating amounts of transmission light required for white display and black display respectively in relation to temperatures of an antiferroelectric liquid crystal unit in accordance with a prior art.

A graph shown in FIG. 8 represents relationships of an amount of transmission light for white display (b) and an amount of transmission light for black display (a) to a temperature of use or a temperature at which a conventional antiferroelectric liquid crystal unit having an antiferroelectric liquid crystal is used. In the conventional antiferroelectric liquid crystal unit, the antiferroelectric liquid crystal panel shown in FIG. 2 is provided with a backlight alone. An amount of light emanating from the backlight is not controlled. The amount of transmission light for white display decreases, as shown in FIG. 8b, with a rise in temperature. However, the amount of transmission light for black display hardly changes as shown in FIG. 8a. A contrast ratio (amount of transmission light for white display/amount of transmission light for black display) decreases with a rise in use temperature.

Figure 1:
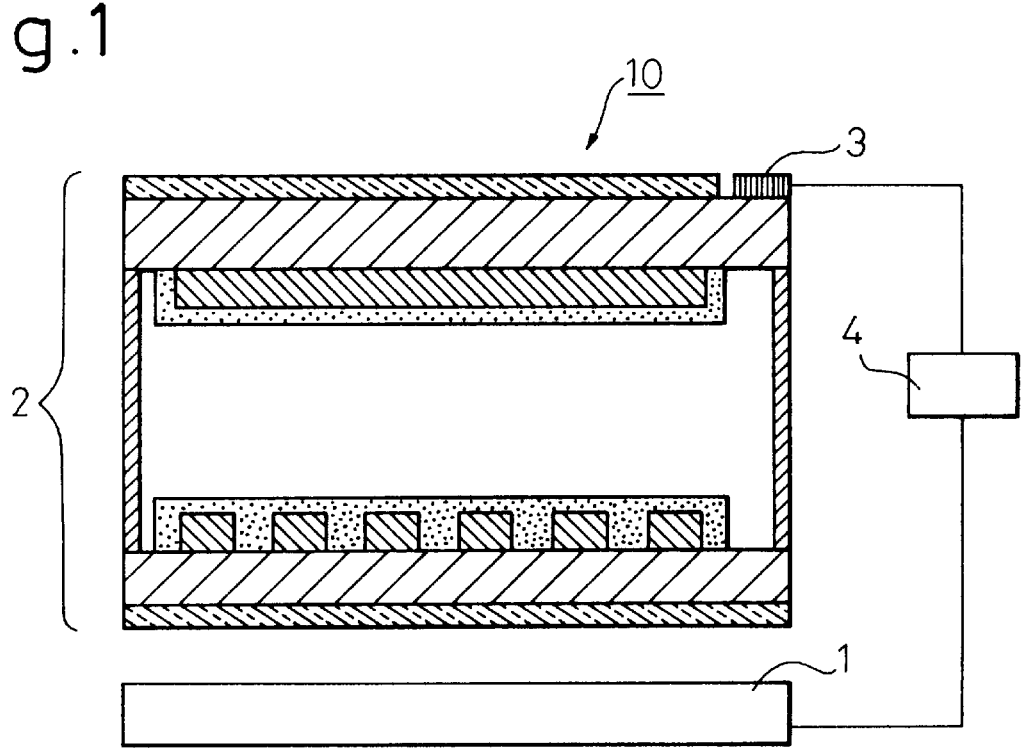
FIG. 1 is a schematic diagram of an antiferroelectric liquid crystal unit that is a form of the first aspect.

FIG. 1 is a diagram schematically showing an antiferroelectric liquid crystal unit of an embodiment of the first aspect and an amount-of-output light control unit connected to a backlight. A liquid crystal unit 10 has an antiferroelectric liquid crystal panel 2 having the structure shown in FIG. 2 and a backlight 1. Moreover, a temperature sensor 3 is placed on a glass substrate. The backlight 1 and temperature sensor 3 are electrically coupled and interlocked with each other via the amount-of-output light control unit 4.

Figure 9:
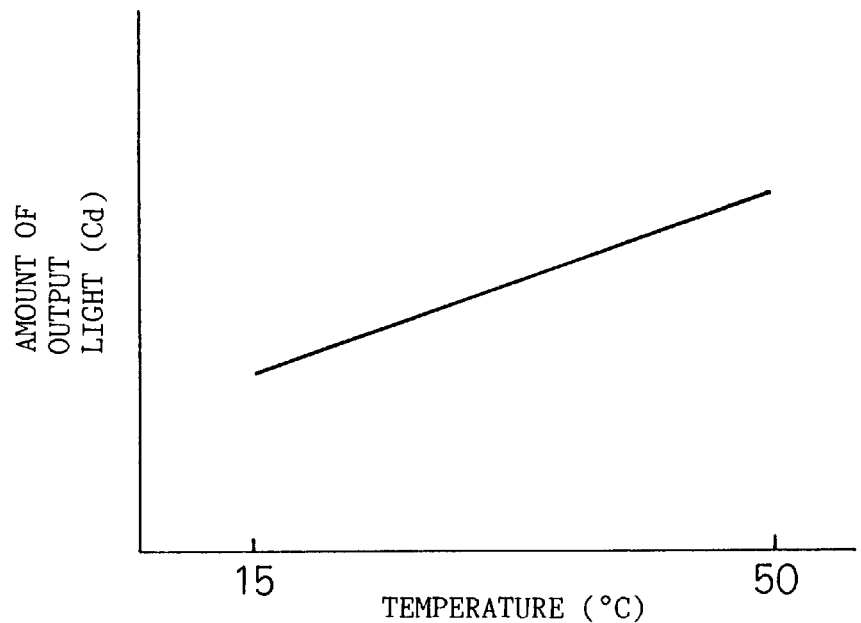
FIG. 9 is a graph showing a relationship of a temperature of a backlight for an antiferroelectric liquid crystal unit in accordance with the first aspect to an amount of output light.
Figure 10:
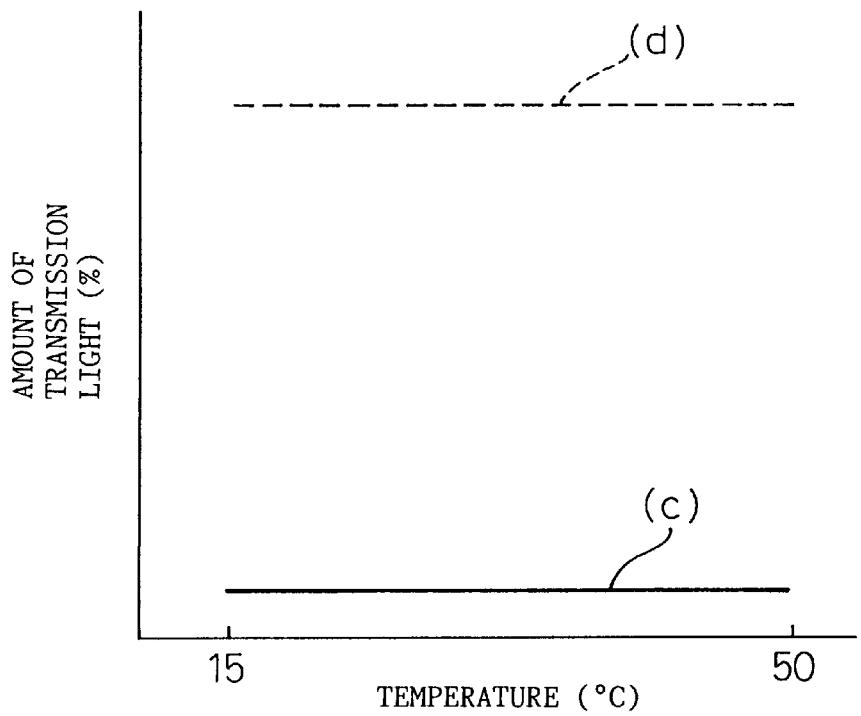
FIG. 10 is a graph indicating amounts of transmission light required for white display and black display respectively in relation to temperatures of the antiferroelectric liquid crystal unit in accordance with the first aspect.

In FIG. 9, the ordinate indicates an amount of light output from the backlight, and the abscissa indicates a temperature of use. In FIG. 10, the ordinate indicates an amount of transmission light and the abscissa indicates the temperature of use. The antiferroelectric liquid crystal unit 10 having the structure shown in FIG. 1 carries out display, and the temperature sensor 3 samples a temperature of use. The amount of light output from the backlight is, as shown in FIG. 9, increased with a rise in temperature of use.

FIG. 10 indicates the results of measuring an amount of transmission light for white display (d) (dashed line) and an amount of transmission light for black display (c) (solid line) in relation to a change in temperature occurring in the antiferroelectric liquid crystal unit 10 having the structure shown in FIG. 1. As illustrated, the amount of transmission light for white display (d) does not depend on the temperature of use and remains substantially constant. This means that a change in contrast ratio for display dependent on a temperature is resolved substantially.

Figure 11:
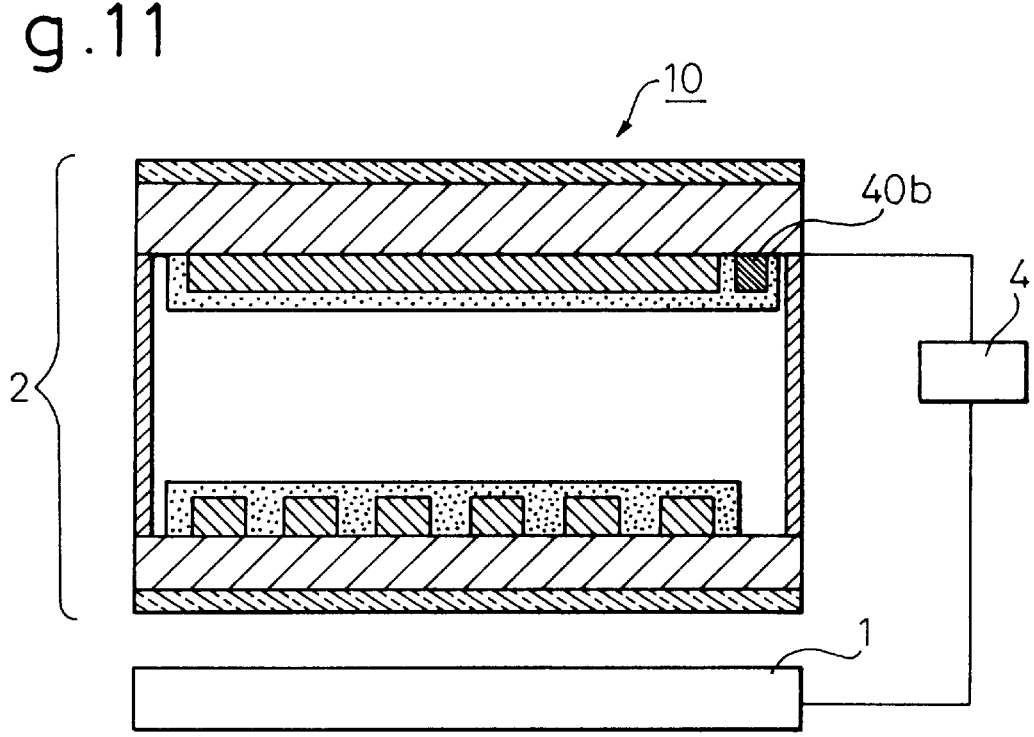
FIG. 11 is a schematic diagram showing an antiferroelectric liquid crystal unit that is another form of the first aspect.

FIG. 11 is a diagram showing schematically an antiferroelectric liquid crystal unit of another embodiment of the first aspect of the present invention, and an amount-of-output light control unit connected to a backlight. A liquid crystal unit 10 has an antiferroelectric liquid crystal panel 2 having the structure shown in FIG. 2, and a backlight 1. An electrode 40b is placed on a glass substrate. The electrode 40b is made of the same material as the material of display electrodes, and produced according to the same process as the process for producing the display electrodes. The electrode 40b is used to measure a polarization reverse current. As illustrated, the backlight 1 and electrode 40b are electrically coupled and interlocked with each other via the amount-of-output light control unit 4.

The antiferroelectric liquid crystal unit having the structure shown in FIG. 11 carries out display, and the electrode 40b is used to measure a polarization reverse current. An amount of light output from the backlight is varied by the amount-of-output light control unit 4 according to a polarization reverse current. When the polarization reverse current gets larger, the amount of light output from the backlight is decreased. When the polarization reverse current gets smaller, the amount of light output from the backlight is increased. The amounts of transmission light required for white display and black display by the antiferroelectric liquid crystal unit 10 having the structure shown in FIG. 11 were measured in relation to a change in temperature. The results of the measurement demonstrate that the amount of transmission light for white display does not depend on the temperature of use but remains substantially constant. This means that a change in contrast ratio dependent on a temperature is resolved substantially.

Figure 12:
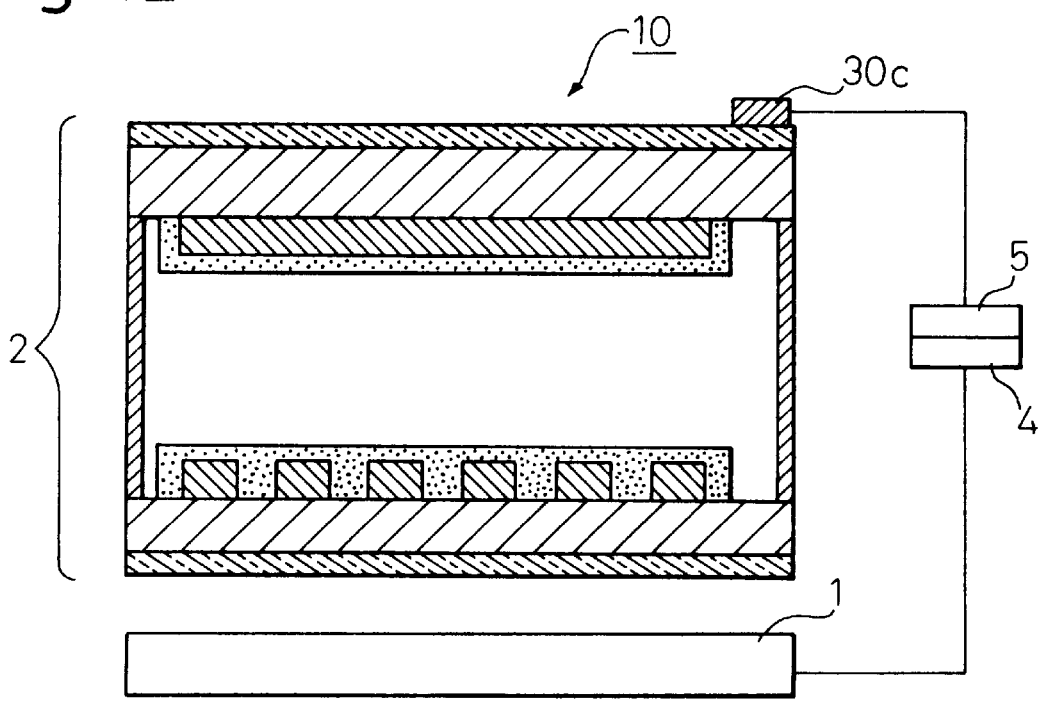
FIG. 12 is a schematic diagram showing an antiferroelectric liquid crystal unit that is yet another form of the first aspect.

FIG. 12 is a diagram schematically showing an antiferroelectric liquid crystal unit of yet another embodiment of the first aspect, and an amount-of-output light control unit connected to a backlight. A liquid crystal unit 10 has an antiferroelectric liquid crystal panel 2 having the structure shown in FIG. 2, and a backlight 1. A transmission light sensor 30c for measuring a luminance level of transmission light having output from the backlight and passed through an antiferroelectric liquid crystal panel is placed on a glass substrate. As illustrated, the backlight 1 and transmission sensor 30c are electrically coupled and interlocked with each other via the amount-of-output light control unit 4. Moreover, the liquid crystal unit 10 is provided with a memory 5 for storing a correlation between a conical angle of an antiferroelectric liquid crystalline molecule and a luminance level of transmission light. Based on the luminance level measured by the transmission light sensor 30c and the correlation stored in the memory, the amount of light output from the backlight is adjusted and light is re-output therefrom.

The amounts of transmission light required for white display and black display by the antiferroelectric liquid crystal unit 10 having the structure shown in FIG. 12 were measured in relation to a change in temperature. The results of the measurement demonstrate that the amount of transmission light for white display does not depend on a temperature of use but remains substantially constant. This means that a change in contrast ratio for display dependent on a temperature is substantially resolved.

Next, embodiments of the second aspect will be described below.

Figure 13:
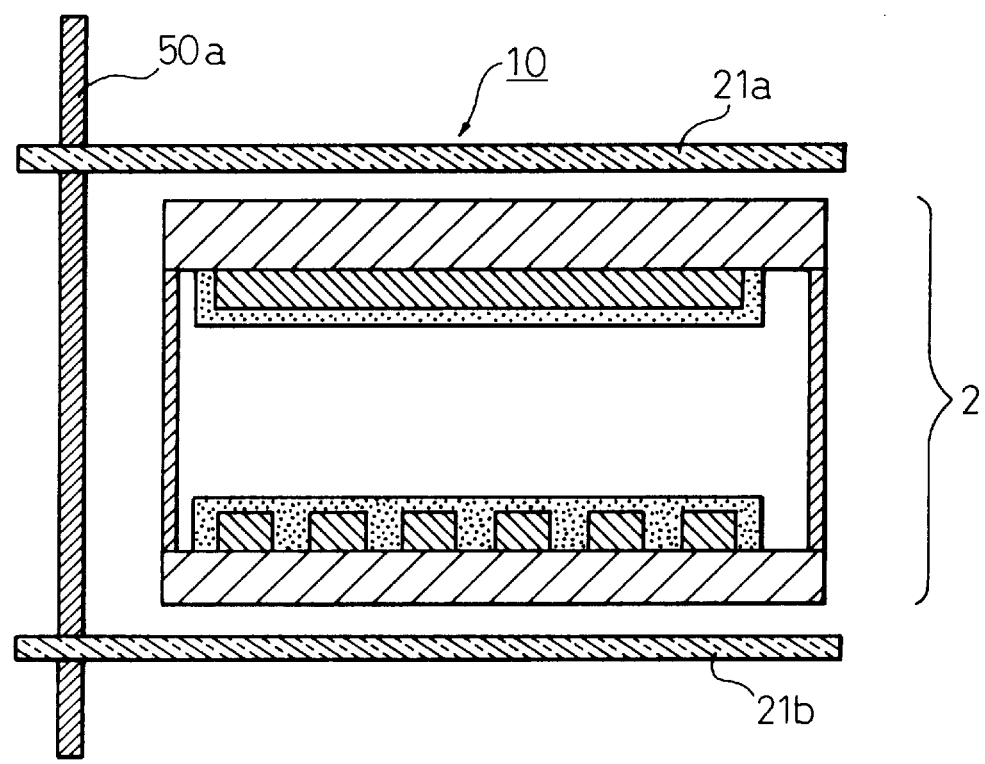
FIG. 13 is a sectional view of a liquid crystal panel that is a form of the second aspect.
Figure 14:
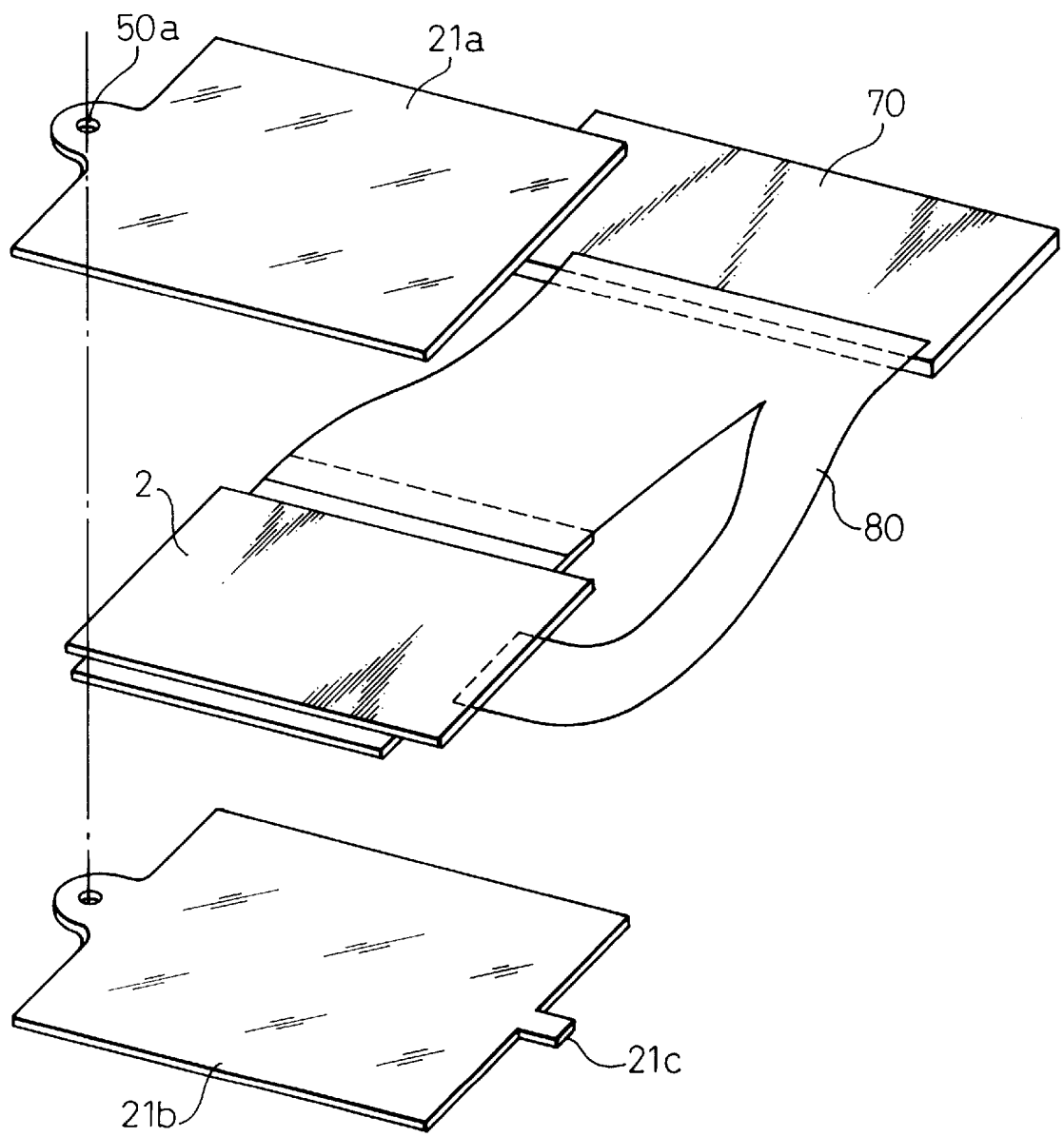
FIG. 14 is an overall exploded view of a liquid crystal panel in accordance with the second aspect.
Figure 15A:
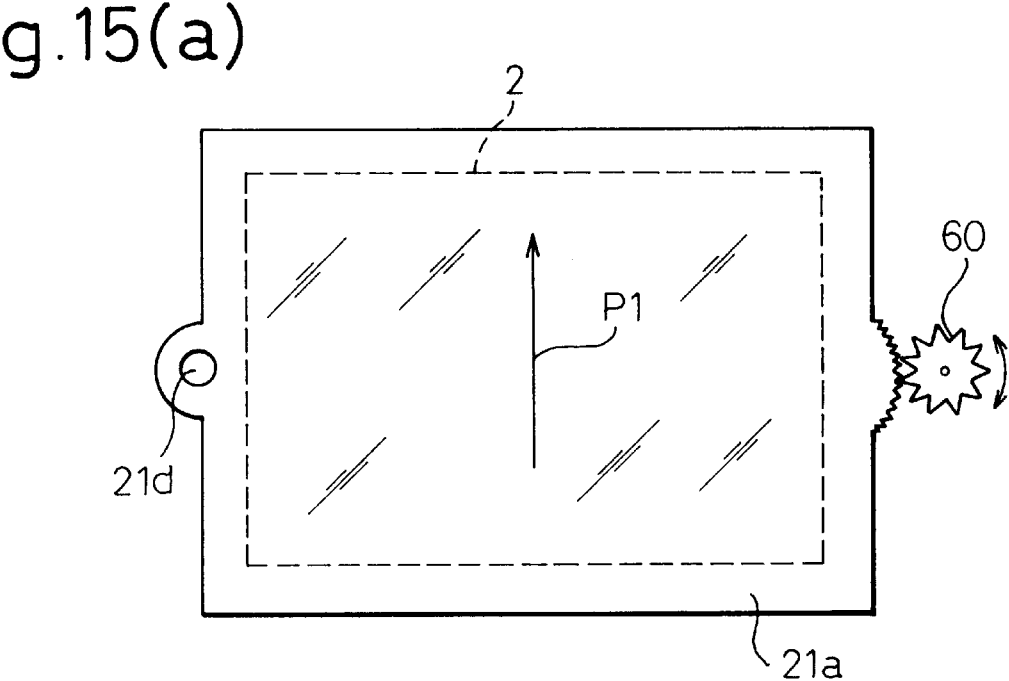
FIGS. 15a and 15b are explanatory diagrams concerning a means for turning sheet polarizers in accordance with the second aspect.
Figure 15B:
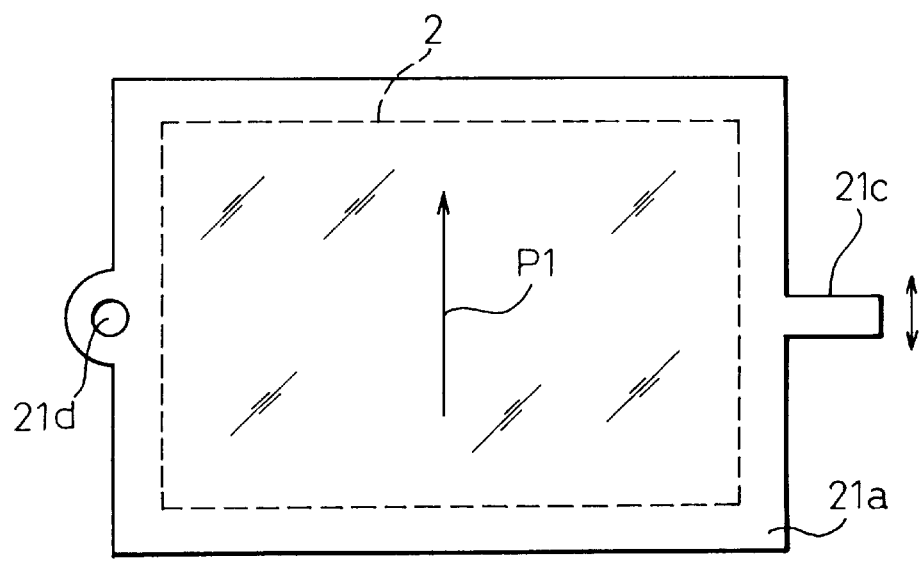

FIG. 13 is a sectional view of a liquid crystal unit in accordance with the second aspect. FIG. 14 is an overall exploded view. FIGS. 15a and 15b are plan views of a liquid crystal display that is seen from above. The liquid crystal panel 2 shown in FIG. 2 is used as a liquid crystal unit 10. The liquid crystal panel 2 has glass substrates, on which display electrodes and orientation films are formed, arranged so that the orientation films will be opposed to each other. A liquid crystal is clamped using a sealing compound. Conventionally, sheet polarizers are fixed to substrates using an adhesive or the like. According to the second aspect, as shown in FIG. 13, a first sheet polarizer 21a and second sheet polarizer 21b that are not fixed to the liquid crystal panel 2 are placed outside the glass substrates. The first and second sheet polarizers share the same axis of rotation 50a. As shown in FIG. 14, a drive circuit 70 for inputting a driving wave is constructed by connecting a flexible printed-circuit (FPC) board 80 to the liquid crystal panel 2 of the liquid crystal display.

As shown in FIGS. 15a and 15b, the sheet polarizers 21a and 21b can be turned arbitrarily with an axis-of-rotation hole 21d, into which the axis of rotation 50 is inserted, as a center. By thus adjusting the sheet polarizers, both or either of planes of polarization produced by the first sheet polarizer 21a and second sheet polarizer 21b is aligned with the major axis of an average molecule of a liquid crystal irrespective of whether the liquid crystal is brought to the first ferroelectric state or second ferroelectric state.

To be more specific, as a structure used for adjustment, as shown in FIG. 15a, a sheet polarizer turning dial 60 to be turned may be adopted. Alternatively, as shown in FIG. 15b, a sheet polarizer turning lever 21c to be moved may be adopted. The sheet polarizer is shaped so that the effective display portion of a glass substrate or liquid crystal panel 2 will not come out after the sheet polarizer is turned. The shape of the sheet polarizer may be a rectangle or sector. Moreover, the plane of polarization P1 produced by the first sheet polarizer 21a and the plane of polarization P2 produced by the second sheet polarizer 21b are fixed at an angle of 90°.

Figure 16A:
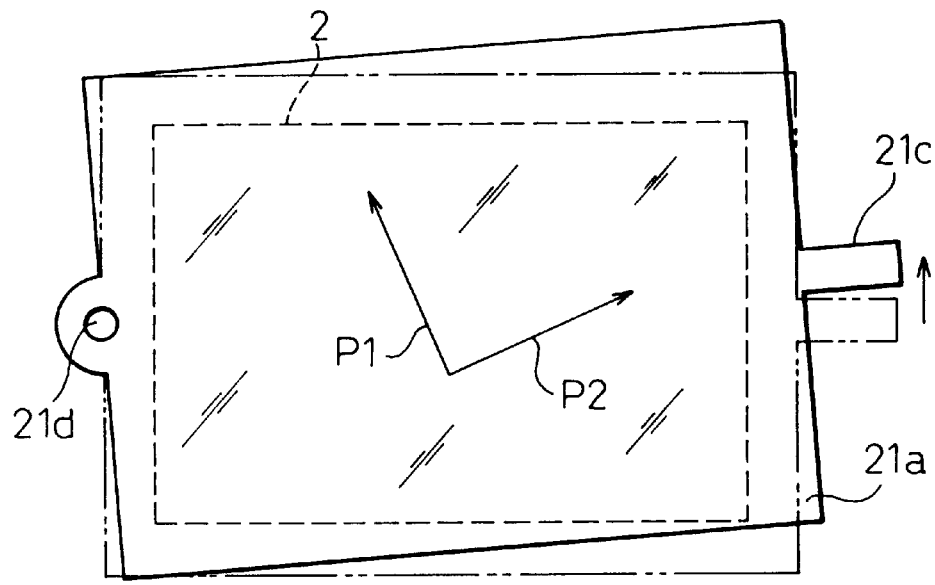
FIGS. 16a and 16b are explanatory diagrams showing sheet polarizers turned relative to the liquid crystal panel in accordance with the second aspect.
Figure 16B:
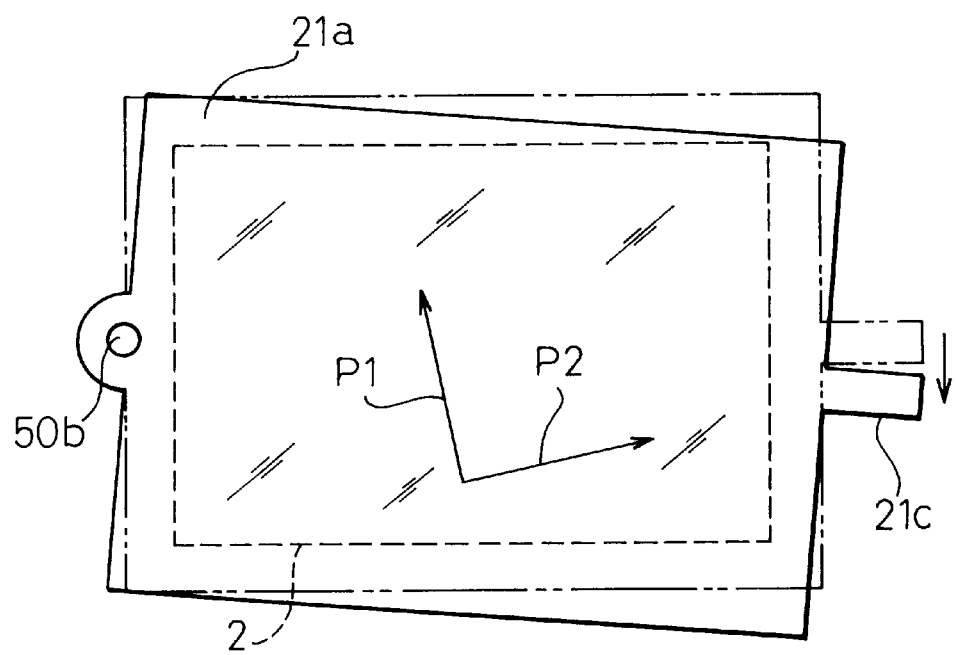

In FIGS. 16a and 16b, the angle of the first sheet polarizer 21a relative to the liquid crystal panel 2 is adjusted. The sheet polarizer turning lever 21 is moved up and down (See an arrow). The first sheet polarizer 21a and second sheet polarizer 21b located as indicated with an alternate long and two short dashes line are then positioned as indicated with a solid line. The plane of polarization P1 produced by the first sheet polarizer 21a and the plane of polarization P2 produced by the second sheet polarizer 21b can thus be tilted relative to the major axis of an average molecule of a liquid crystal staying in the first or second ferroelectric state.

Figure 19:
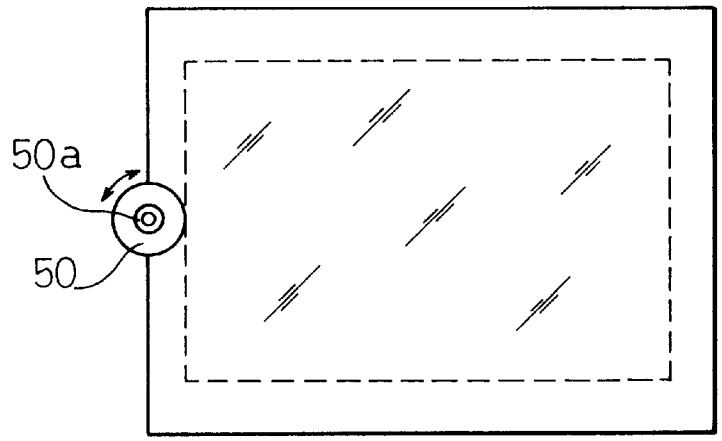
FIG. 19 is a plan view showing a device with a stepper motor serving as a sheet polarizer turning means for the liquid crystal penal in accordance with the second aspect.

As a method of turning the sheet polarizer, a method of manually turning them by moving the sheet polarizer turning dial 60 or sheet polarizer turning lever 21c has been described in conjunction with FIGS. 15a and 15b. Another method is a method in which a micro stepper motor 50 is, as shown in FIG. 19, used as a turning control unit and engaged with an axis of rotation 50a. In this case, the micro stepper motor 50 is engaged with the axis of rotation 50a, and used to turn both sheet polarizers according to a change in conical angle of a liquid crystalline molecule. The sheet polarizers are located at an angle of substantially 90°. Planes of polarization produced by the sheet polarizers are aligned with each other so that an amount of transmission light required for dark display will be minimized.

Figure 20:
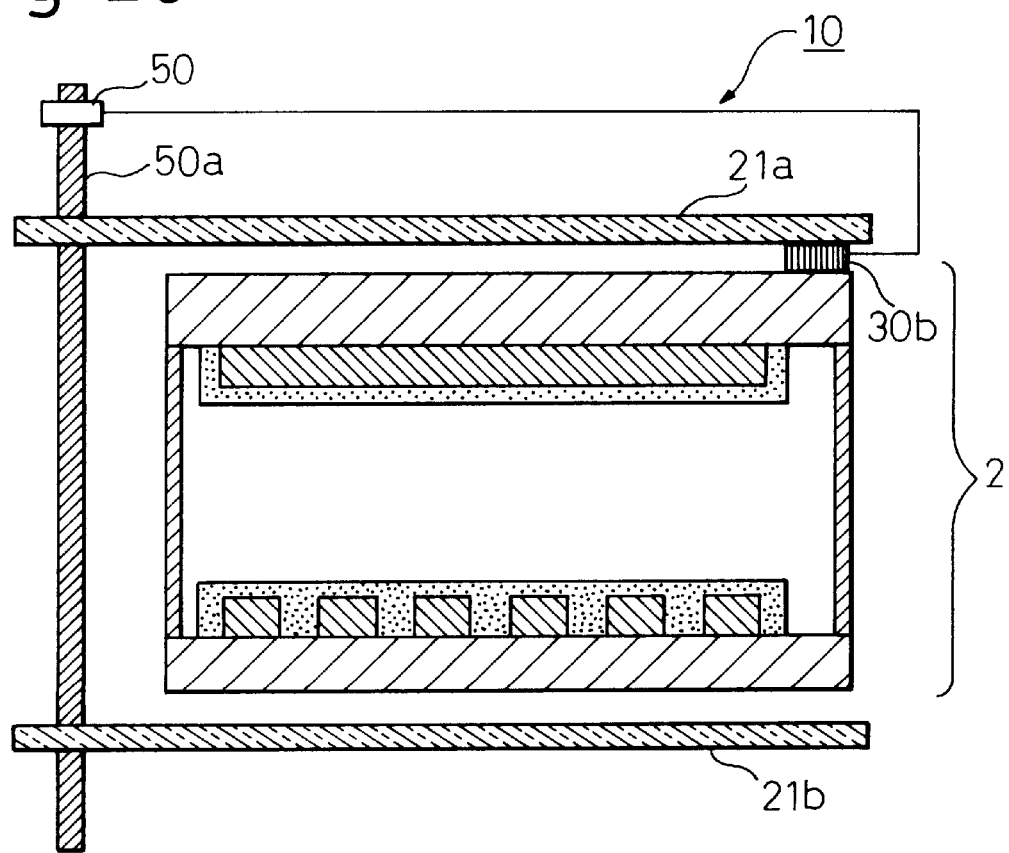
FIG. 20 is a sectional view of a liquid crystal panel that is another form of the second aspect.

Embodiments of the second aspect will be described in conjunction with the drawings. FIG. 20 is a diagram showing the structure of a liquid crystal panel of this embodiment, that is, the liquid crystal panel 2 shown in FIG. 2. A temperature sensor 30b is placed on a glass substrate. A stepper motor 50 serving as a control unit for controlling turning of the sheet polarizers 21a and 21b is engaged with an axis of rotation. The stepper motor 50 and temperature sensor 30b are electrically coupled and interlocked with each other.

Figure 17:
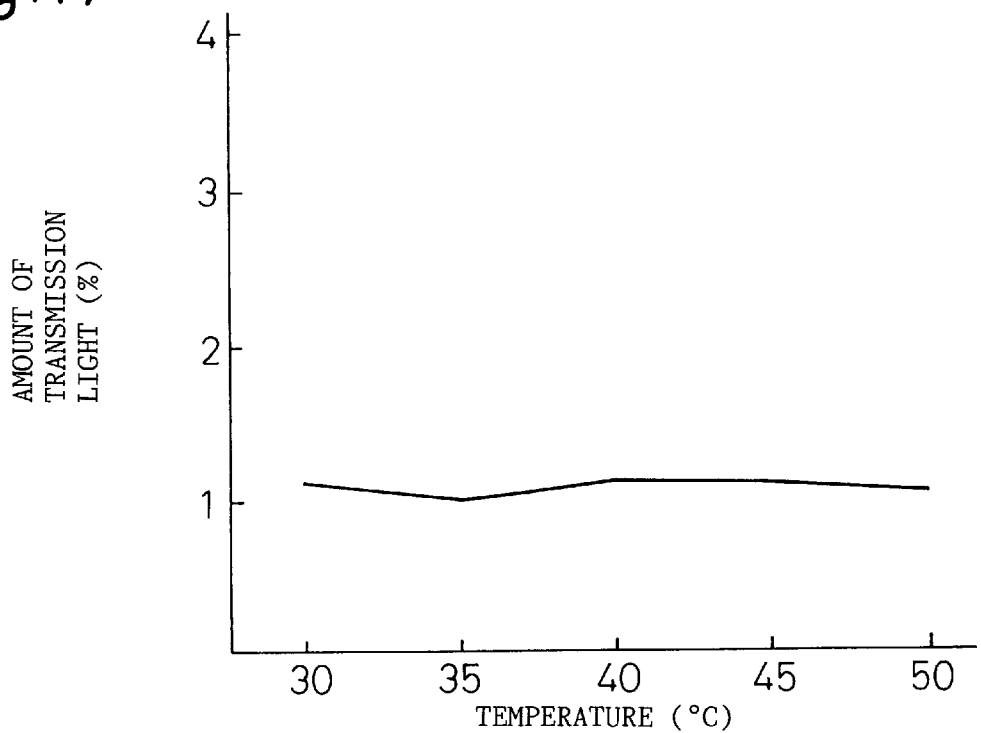
FIG. 17 is a graph showing amounts of transmission light required for dark display in relation to temperatures of the liquid crystal panel in accordance with the second aspect.
Figure 18:
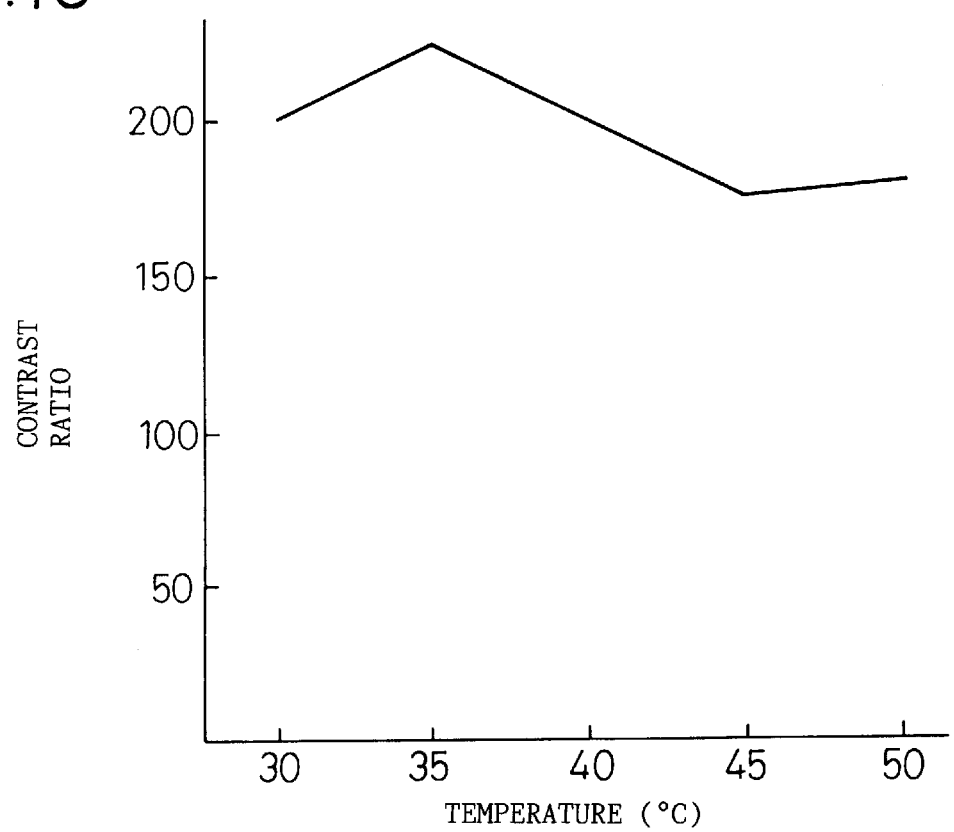
FIG. 18 is a graph showing contrast ratios for display in relation to temperatures of the liquid crystal panel in accordance with the second aspect.

The liquid crystal unit having the structure shown in FIG. 20 is used to carry out display. The temperature sensor 30b is used to sample a temperature of use. An angle of rotation by which the sheet polarizers are turned is varied depending on a temperature by means of the stepper motor 50. FIG. 17 shows the results of measuring an amount of transmission light required for dark display in relation to a change in temperature, wherein the liquid crystal unit shown in FIG. 20 is taken for instance. As illustrated, an amount of transmission light for dark display does not depend on a temperature but remains substantially constant. As shown in FIG. 18, a change in contrast ratio for display dependent on a temperature is reduced.

Figure 21:
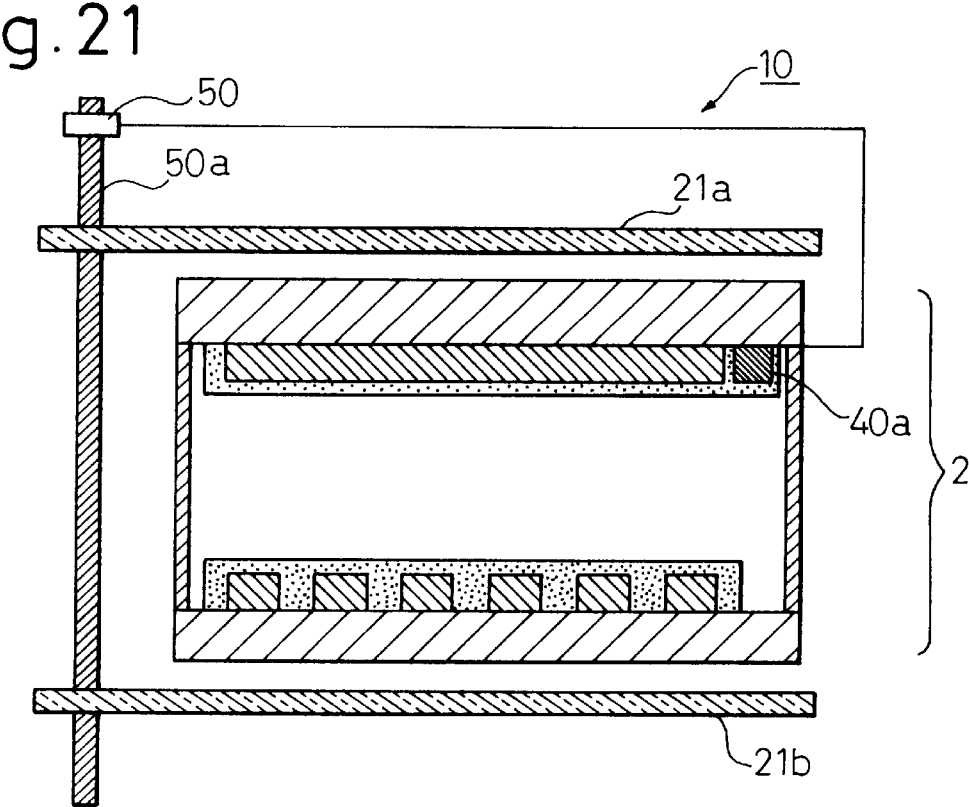
FIG. 21 is a sectional view of a liquid crystal panel that is yet another form of the second aspect.

FIG. 21 is a diagram showing a structure of another embodiment of the second aspect. A stepper motor 50 is engaged with an axis of rotation 50a. An electrode 40a is placed on a glass substrate. The electrode 40a is made of the same material as display electrodes and produced according to the same process as they are produced. The axis of rotation 50a and electrode 40a are electrically coupled and interlocked with each other via the stepper motor 50.

The liquid crystal unit having the structure shown in FIG. 21 is used for display. The electrode 40a is used to measure a polarization reverse current. An angle of rotation by which the sheet polarizers are turned is varied depending on a polarization reverse current. The amounts of transmission light required by the liquid crystal unit having the structure shown in FIG. 21 were measured. The results of the measurement demonstrate that the amount of transmission light for dark display does not depend on a temperature but remains substantially constant. A change in contrast ratio for display dependent on a temperature is resolved substantially.

Figure 22:
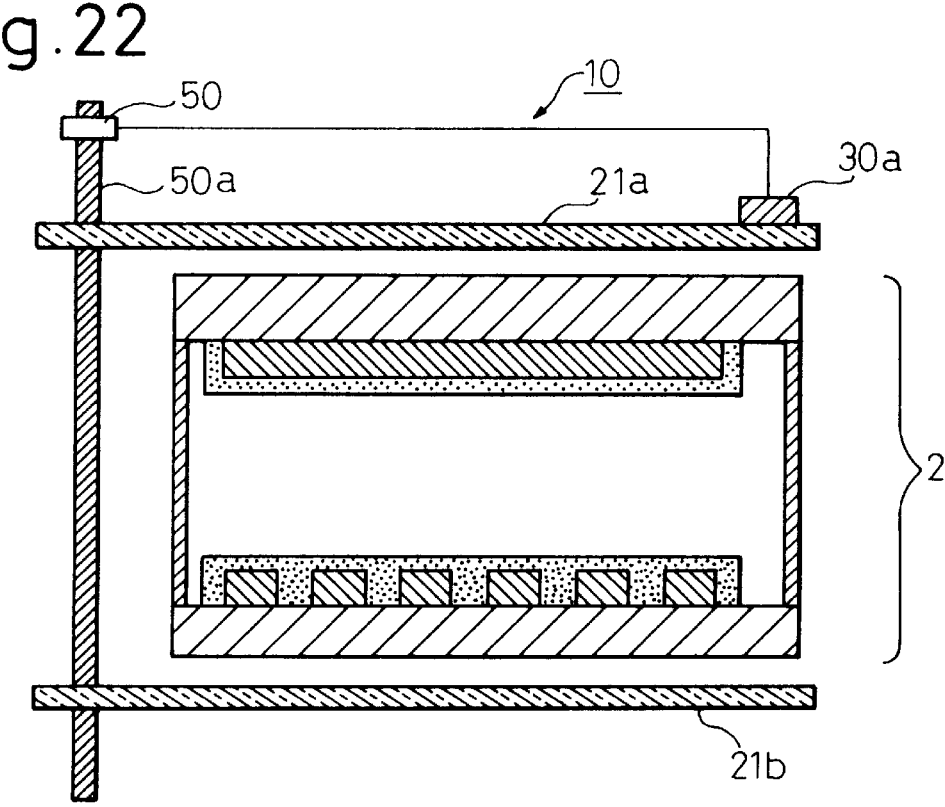
FIG. 22 is a sectional view of a liquid crystal panel that is still another form of the second aspect.

FIG. 22 is a diagram showing yet another embodiment of the second aspect of the present invention. A stepper motor 50 is engaged with an axis of rotation 50a. A transmission light sensor 30a for measuring an amount of transmission light, which has passed through a liquid crystal panel, is placed on a glass substrate. The axis of rotation 50a and light transmission sensor 30a are electrically coupled and interlocked with each other via the stepper motor 50.

In the liquid crystal unit having the structure shown in FIG. 22, an angle of rotation by which the sheet polarizers are turned is varied depending on a change in amount of transmission light for dark display, which is detected by the transmission light sensor 30a, by means of the stepper motor. In the liquid crystal unit having the structure shown in FIG. 22, the amount of transmission light for dark display does not depend on a temperature of use but remains substantially constant. A change in contrast ratio for display dependent on a temperature is resolved.

In the liquid crystal unit according to the second aspect, the major axis of an average molecule of a liquid crystal staying in a ferroelectric state is always aligned with a plane of polarization produced by either of the sheet polarizers. This means that a transmittance of light for dark display remains almost constant irrespective of a temperature. Consequently, a contrast ratio for display that is a ratio of an amount of transmission light for dark display to an amount of transmission light for bright display can always be set to a high value.

Embodiments of the third aspect of the present invention will be described below.

According to the third aspect of the present invention, a liquid crystal panel has a liquid crystal, which assumes at least first and second ferroelectric states, sandwiched between a pair of substrates. First and second sheet polarizers are placed to interpose the pair of substrates between them. A plane of polarization produced by the first sheet polarizer and a plane of polarization produced by the second sheet polarizer are fixed at an angle of substantially 90°.

Two planes are defined at angles that are halves of angles defined by the plane of polarization produced by the first sheet polarizer and the plane of polarization produced by the second sheet polarizer. One of the planes is regarded as a first intermediate plane, and the other is regarded as a second intermediate plane.

The sheet polarizers are arranged so that: a direction in which the major axis of an average molecule of a ferroelectric liquid crystal is oriented in one of the first and second ferroelectric states will always be located between the plane of polarization produced by the second sheet polarizer and the first intermediate plane at a temperature falling within a use temperature range within which the ferroelectric liquid crystal panel is usable; and a direction in which the major axis of the average molecule of the ferroelectric liquid crystal is oriented in the other ferroelectric state will always be located between the plane of polarization produced by the first sheet polarizer and the first intermediate plane.

Alternatively, the sheet polarizers are arranged so that: a direction in which the major axis of the average molecule of the ferroelectric liquid crystal is oriented in one ferroelectric state will always be located between the plane of polarization produced by the second sheet polarizer and the second intermediate plane; and a direction in which the major axis of the average molecule of the ferroelectric liquid crystal is oriented in the other ferroelectric state will always be located between the plane of polarization produced by the second sheet polarizer and the first intermediate plane.

Alternatively, the sheet polarizers are arranged so that: a direction in which the major axis of the average molecule of the ferroelectric liquid crystal is oriented in one ferroelectric state will always be located between the plane of polarization produced by the first sheet polarizer and the first intermediate plane; and a direction in which the major axis of the average molecule of the ferroelectric liquid crystal is oriented in the other ferroelectric state will always be located between the plane of polarization produced by the first sheet polarizer and the second intermediate plane.

A curve indicating a change in amount of transmission light relative to a change in conical angle, which occurs at a temperature falling within a use temperature range within which the ferroelectric liquid crystal panel achieves white display, has neither a maximal value nor minimal value. In short, the change curve exhibits a monotonous decrease or monotonous increase. Moreover, a curve indicating a change in amount of transmission light relative to a change in temperature, which occurs at a temperature within a range of temperature of use within which black display is achieved, has neither a maximal value nor a minimal value. In short, the change curve exhibits a monotonous decrease or a monotonous increase. Furthermore, a differential coefficient of a function represented by a curve indicating a change in amount of transmission light due to a change in conical angle, which occurs at a temperature within a range of temperature of use within which white display is achieved, has the same property as a differential coefficient of a function represented by a curve indicating a change in amount of transmission light due to a change in temperature of use which occurs at a temperature within a temperature of use range within which black display is achieved.

A contrast ratio for display is a ratio of an amount of transmission light required for white display to an amount of transmission light required for black display. Even if the amount of transmission light for white display decreases depending on a temperature of use, since the amount of transmission light for black display decreases, a change in contrast ratio for display will be substantially resolved. Moreover, even when the amount of transmission light for white display increases, the amount of transmission light for black display increases. The same effect can be exerted.

Furthermore, when a ferroelectric liquid crystal unit is provided with a backlight, an amount of light output from the backlight is varied depending on a conical angle of a ferroelectric liquid crystalline molecule. A function represented by a curve indicating a change in amount of light output from the backlight is determined so that a differential coefficient of the function will exhibit a property opposite to the property of a differential coefficient of a function represented by a curve indicating a change in amount of transmission light for white display or black display. Specifically, when the amounts of transmission light required for white display and black display increase, the amount of light output from the backlight is decreased. When the amounts of transmission light for white display and black display decrease, the amount of light output from the backlight is increased. Thus, a contrast ratio for display can be kept constant and at a better value.

As described previously, a conical angle of a liquid crystalline molecule changes according to a use temperature. A temperature sensor is placed on a substrate of a ferroelectric liquid crystal panel in order to measure the temperature of liquid crystalline molecules. The temperature sensor and backlight are electrically coupled and interlocked with each other. An amount of light output from the backlight may thus be adjusted.

Moreover, as mentioned above, a conical angle of a liquid crystalline molecule can be calculated by measuring a polarization reverse current instead of a use temperature. In general, when a ferroelectric liquid crystal is switched from one ferroelectric state to the other ferroelectric state, a spontaneous polarization is reversed. This causes, as already known, a reverse current to flow through a liquid crystal panel. The level of the polarization reverse current is directly proportional to the magnitude of the spontaneous polarization. The magnitude of the spontaneous polarization changes with a temperature. A change in temperature can therefore be calculated by calculating a change in polarization reverse current. In other words, a change in conical angle of a liquid crystalline molecule can be worked out by checking the change in polarization reverse current. For measuring the polarization reverse current, another electrode different from electrodes forming pixels may be included. In this case, a change in polarization reverse current is checked, and the electrode and backlight are electrically coupled and interlocked with each other. An amount of light output from the backlight is thus varied.

Alternatively, inclusion of a transmission sensor is conceivable. In this case, a luminance level of transmission light transmitted by a liquid crystal panel is measured using a photodiode or the like. A luminance level permitted by a backlight is varied depending on a change in amount of transmission light.

Embodiments of the third aspect of the present invention will be described in conjunction with the drawings. In the embodiments, the liquid crystal panel 2 shown in FIG. 2 can be used as it is. The structure shown in FIG. 2 has already been described and a reiteration will be omitted. For a better understanding, planes named as intermediate planes are located at angles that are halves of angles defined by a plane of polarization produced by a first sheet polarizer and a plane of polarization produced by a second sheet polarizer. Since two intermediate planes exist, one of the two intermediate planes is regarded as a first intermediate plane, and the other is regarded as a second intermediate plane.

Figure 28:
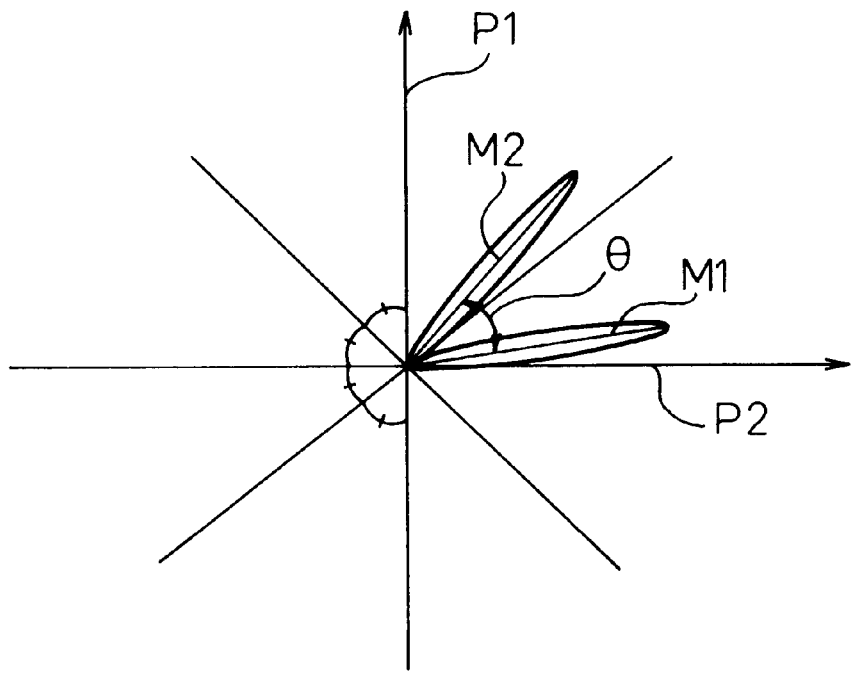
FIG. 28 is an explanatory diagram (No. 1) showing a plane of polarization produced by a sheet polarizer in accordance with the third aspect, and the major axis of an average molecule of a liquid crystal.
Figure 29:
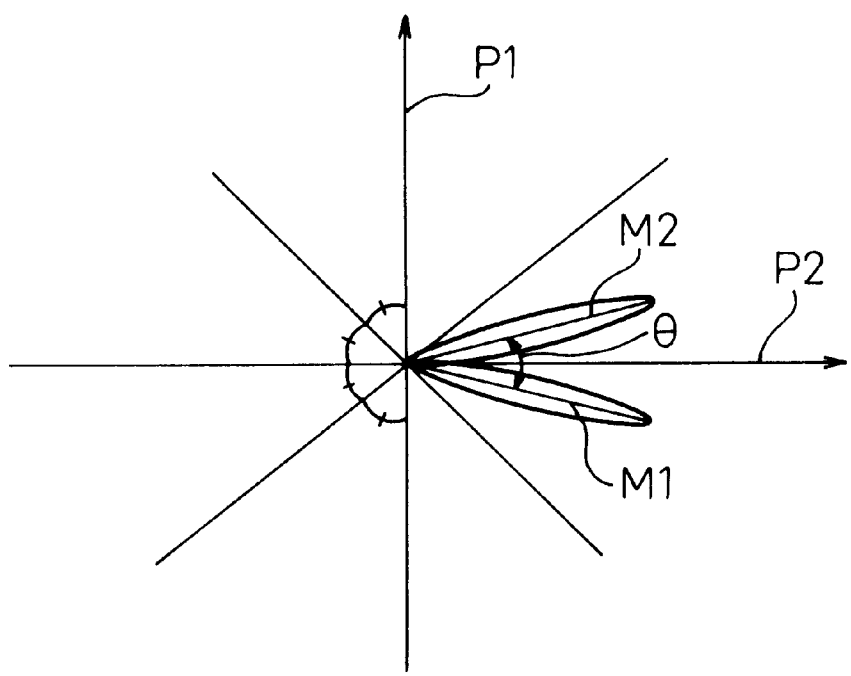
FIG. 29 is an explanatory diagram (No. 2) showing the plane of polarization produced by the sheet polarizer in accordance with the third aspect, and the major axis of the average molecule of the liquid crystal.

In one embodiment, as shown in FIG. 28, sheet polarizers are arranged so that: a direction in which the major axis of an average molecule of a light crystal is oriented in one ferroelectric state will always be located between a plane of polarization produced by the second sheet polarizer and the first intermediate plane; and a direction in which the major axis of the average molecule of the liquid crystal is oriented in the other ferroelectric state will always be located between the first sheet polarizer and first intermediate plane. This embodiment will be described by taking a ferroelectric liquid crystal as a liquid crystal, though this embodiment can be adapted to an antiferroelectric liquid crystal alike.

A minimum use temperature or a minimum temperature at which a ferroelectric liquid crystal unit is usable is 10° C., and a maximum use temperature is 40° C. What is referred to as a range of temperature of use is a range from 10° C. to 40° C. or the minimum use temperature to maximum temperature of use. As described in conjunction with FIG. 6, a temperature of use of a ferroelectric liquid crystal and a conical angle have such a relationship that the conical angle of a ferroelectric liquid crystalline molecule gets smaller with a rise in temperature.

Figure 35:
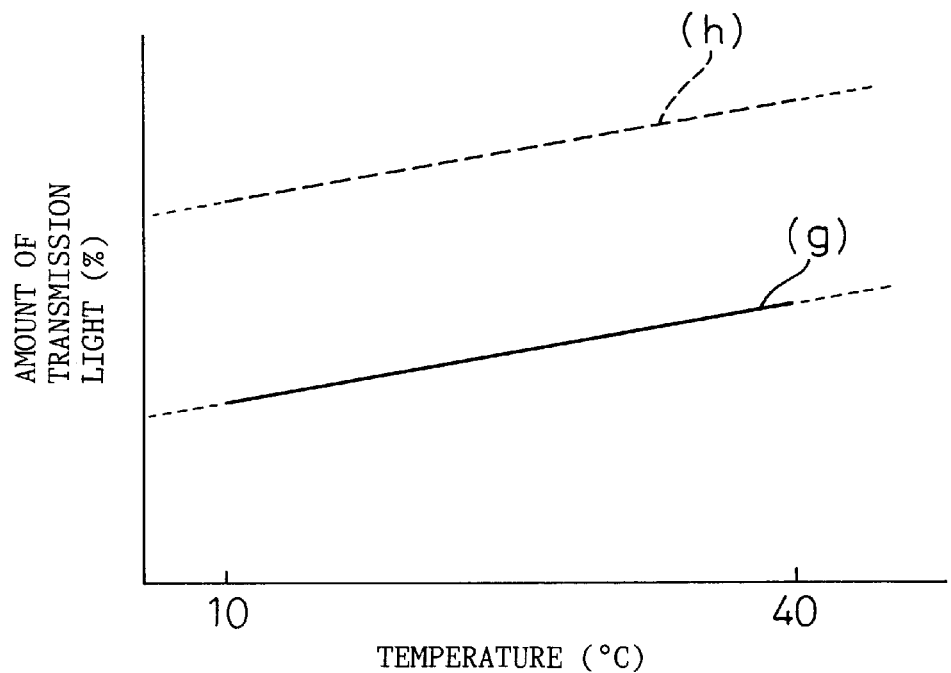
FIG. 35 is a graph (No. 1) indicating amounts of transmission light required for white display and black display in relation to temperatures of a ferroelectric liquid crystal unit in accordance with the third aspect of the present invention.
Figure 36:
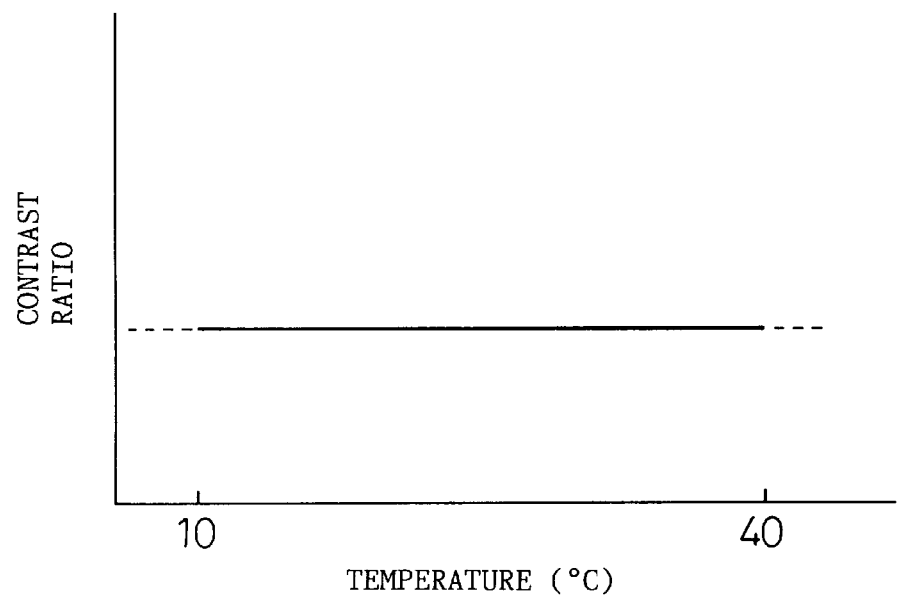
FIG. 36 is a graph (No. 1) showing a relationship of a contrast ratio to a temperature of the ferroelectric liquid crystal unit in accordance with the third aspect of the present invention.

FIG. 35 is a graph indicating relationships of an amount of transmission light for white display (h) and an amount of transmission light for black display (g) to a temperature of use. Herein, the liquid crystal unit of this embodiment having the ferroelectric liquid crystal carries out display. As the temperature of use rises, the amounts of transmission light increase. A contrast ratio for display, that is, a ratio of the amount of transmission light for white display to the amount of transmission light for black display does not depend on the temperature of use as seen from FIG. 36. The contrast ratio for display remains constant and a satisfactory display state can be realized.

Furthermore, an amount of light output from a backlight is adjusted. The structure shown in FIG. 1 can be employed in a liquid crystal unit of the third aspect of the present invention. As mentioned previously, the liquid crystal unit comprises a liquid crystal panel 2 having the structure shown in FIG. 2 and a backlight 1. A temperature sensor 3 is placed on a glass substrate. The backlight 1 and temperature sensor 3 are electrically coupled and interlocked with each other via an amount-of-output light control unit 4.

Figure 37:
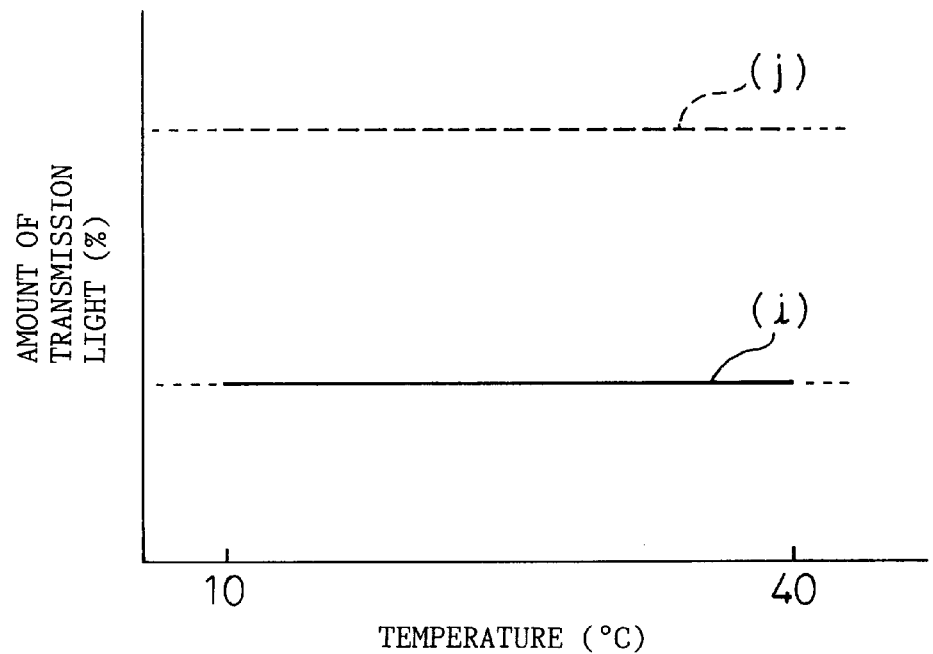
FIG. 37 is a graph (No. 2) indicating amounts of transmission light required for white display and black display in relation to temperatures of the ferroelectric liquid crystal unit in accordance with the third aspect of the invention.

The liquid crystal unit having the structure shown in FIG. 1 carries out display, and the temperature sensor 3 samples a temperature of use. The output control unit varies an amount of light output from the backlight for each temperature. The amount of light output from the backlight is increased as the temperature of use drops. FIG. 37 indicates the results of measuring an amount of transmission light for white display (j) and an amount of transmission light for black display (i) relative to a change in temperature of the ferroelectric liquid crystal unit. Note that the amount of light output from the backlight in the ferroelectric liquid crystal unit has been adjusted. As shown in FIG. 37, the amounts of transmission light for white display and black display do not depend on the temperature of use but remain substantially constant. Compared with the graph in FIG. 35 indicating amounts of transmission light required when an amount of light output from a backlight is not adjusted, a better display quality can be realized.

The structure shown in FIG. 11 can be adapted to the liquid crystal unit of this embodiment. As mentioned above, a ferroelectric liquid crystal panel 2 having the structure shown in FIG. 2 is provided with a backlight 1. An electrode 40b is placed on a glass substrate. The electrode 40b is made of the same material as display electrodes, and produced according to a similar process. The backlight 1 and electrode 40b are electrically coupled and interlocked with each other via an amount-of-output light control unit 4.

The ferroelectric liquid crystal unit having the structure shown in FIG. 11 carries out display, and the electrode 40b is used to measure a polarization reverse current. The output control unit varies an amount of light output from the backlight according to a polarization reverse current. When the polarization reverse current gets larger, the amount of light output from the backlight is increased. When the polarization reverse current gets smaller, the amount of light output from the backlight is decreased. The amounts of transmission light required for white display and black display by the ferroelectric liquid crystal panel having the structure shown in FIG. 11 were measured in relation to a change in temperature. The results of the measurement are the same as the results graphically shown in FIG. 37. That is to say, the amounts of transmission light do not depend on the temperature of use but remain substantially constant. A difference in contrast ratio for display between temperatures is substantially resolved. Satisfactory display quality is realized.

The structure shown in FIG. 12 can be employed in this embodiment. Specifically, a ferroelectric liquid crystal panel 2 having the structure shown in FIG. 2 is provided with a backlight 1. A transmission light sensor 30c for measuring a luminance level of transmission light that has been output from the backlight and passed through the ferroelectric liquid crystal panel is placed on a glass substrate. The backlight 1 and transmission light sensor 30c are electrically coupled and interlocked with each other via an amount-of-output light control unit 4. Moreover, the liquid crystal unit is provided with a memory 5 for storing a correlation between a conical angle of a ferroelectric liquid crystalline molecule and a luminance level of transmission light. Based on the luminance level measured by the transmission light sensor 30c and the correlation stored in the memory 5, an amount of light output from the backlight is adjusted and light is re-output therefrom.

The amounts of transmission light required for white display and black display by the ferroelectric liquid crystal unit having the structure shown in FIG. 12 were measured in relation to a change in temperature. The results of the measurement are identical to those graphically shown in FIG. 37. Namely, the amounts of transmission light do not depend on the temperature of use but remain substantially constant. A difference in contrast ratio for display between temperatures is substantially resolved, and satisfactory display quality is realized.

According to another embodiment, sheet polarizers are arranged so that: a direction in which the major axis of an average molecule of a ferroelectric liquid crystal is oriented in one ferroelectric state will always be located between a plane of polarization produced by a second sheet polarizer and a second intermediate plane; and a direction in which the major axis of the average molecule of the ferroelectric liquid crystal is oriented in the other ferroelectric state will always be located between the second sheet polarizer and a first intermediate plane.

Figure 30:
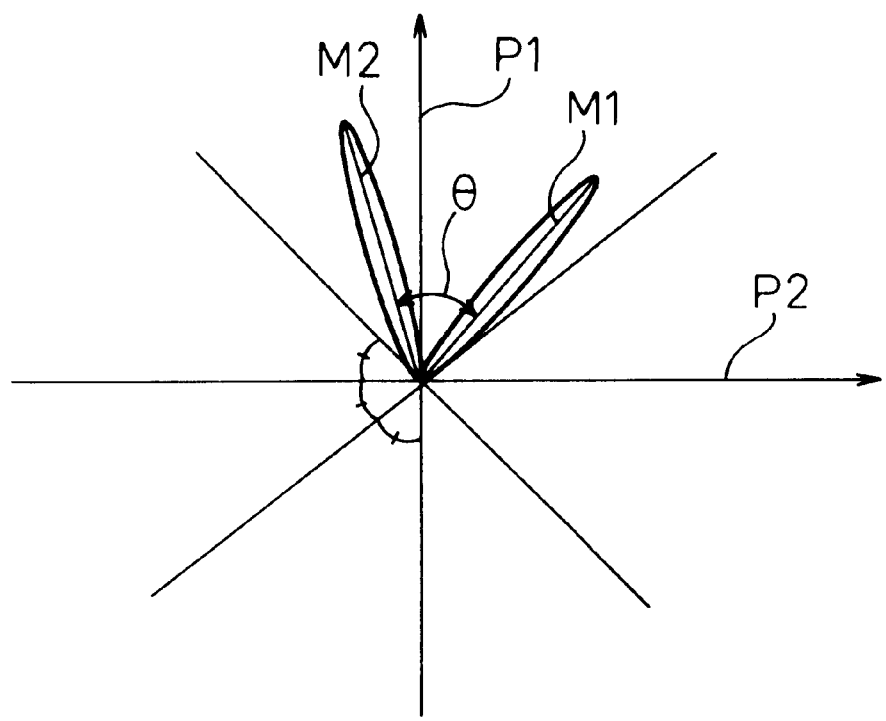
FIG. 30 is an explanatory diagram (No. 3) showing the plane of polarization produced by the sheet polarizer in accordance with the third aspect, and the major axis of the average molecule of the liquid crystal.

Alternatively, the sheet polarizers are, as shown in FIG. 30, arranged so that: a direction in which the major axis of the average molecule of the ferroelectric liquid crystal is oriented in one ferroelectric state will always be located between the plane of polarization produced by the first sheet polarizer and the first intermediate plane; and a direction in which the major axis of the average molecule of the ferroelectric liquid crystal is oriented in the other ferroelectric state will always be located between the first sheet polarizer and the second intermediate plane. A minimum temperature of use or a minimum temperature at which the ferroelectric Liquid crystal panel of this embodiment can be usable is 10° C., and a maximum temperature of use thereof is 40° C. What is referred to as a use temperature range is a range from the minimum temperature of use to the maximum temperature of use.

The ferroelectric liquid crystal employed in this embodiment is made of the same material as the one in the previous embodiment. A conical angle of a ferroelectric liquid crystalline molecule gets smaller with a rise in temperature.

Figure 38:
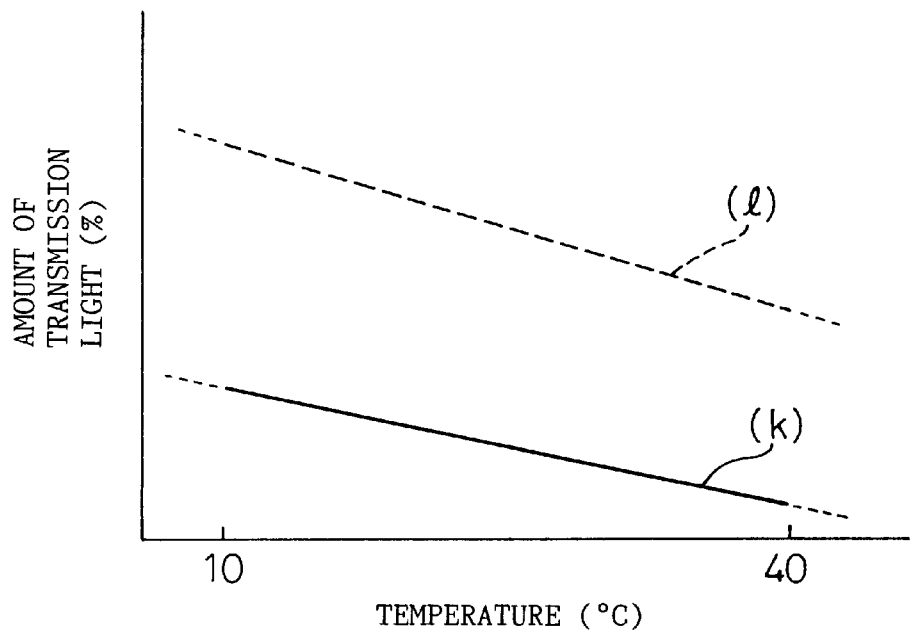
FIG. 38 is a graph (No. 3) indicating amounts of transmission light required for white display and black display in relation to temperatures of the ferroelectric liquid crystal unit in accordance with the third aspect of the present invention.
Figure 39:
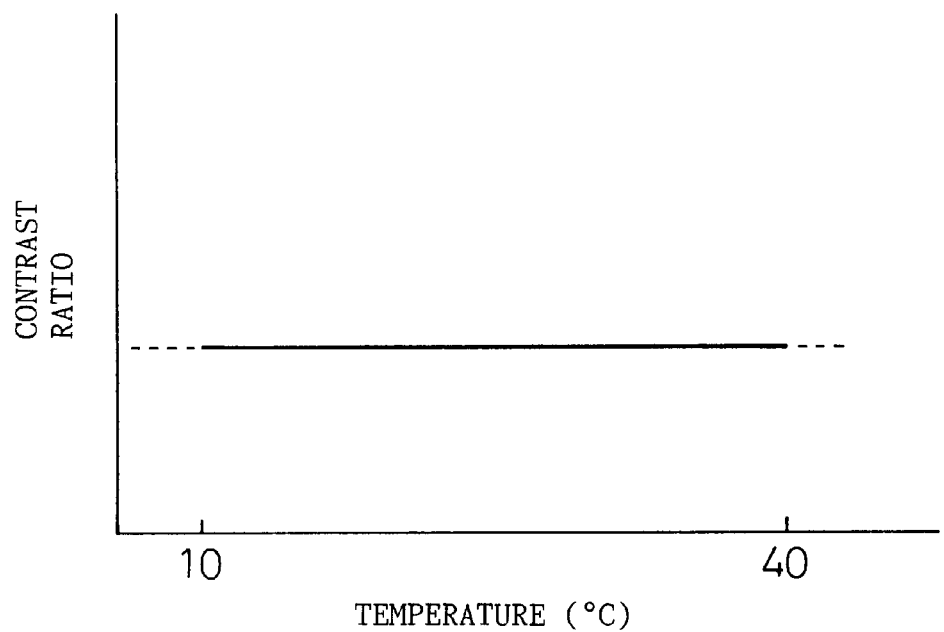
FIG. 39 is a graph (No. 2) indicating a relationship of a contrast ration to a temperature of the ferroelectric liquid crystal unit in accordance with the third aspect of the present invention.

FIG. 38 is a graph indicating relationships of an amount of transmission light for white display (l) and an amount of transmission light for black display (k) to a temperature of use. Herein, the ferroelectric liquid crystal panel of this embodiment having the above ferroelectric liquid crystal is used for display. As the use temperature rises, the amounts of transmission light drop. A contrast ratio for display, that is, a ratio of the amount of transmission light for white display to the amount of transmission light for black display does not, as shown in FIG. 39, depend on the temperature of use. The contrast ratio for display remains constant, and a satisfactory display state can be realized.

Moreover, an amount of light output from the backlight is adjusted. Like the aforesaid embodiment, a ferroelectric liquid crystal unit having the structure shown in FIG. 1 is adopted. The ferroelectric liquid crystal unit having the structure shown in FIG. 1 carries out display and the temperature sensor 3 samples a temperature of use. The output control unit 4 varies an amount of light output from the backlight according to each temperature. The amount of light output from the backlight is increased with a rise in temperature of use. After the amount of light output from the backlight was adjusted, the amounts of transmission light required for white display and black display by a ferroelectric liquid crystal panel were measured in relation to a change in temperature. The results of the measurement are identical to those graphically shown in FIG. 37. As shown in FIG. 37, the amounts of transmission light for white display and black display do not depend on the temperature of use but remain substantially constant. Compared with the results of a measurement shown in FIG. 38 for which the amount of light output from the backlight has not been adjusted, the results of the measurement shown in FIG. 37 demonstrate better display quality.

A ferroelectric liquid crystal having the structure shown in FIG. 11 is used to carry out display. The electrode 40b is used to measure a polarization reverse current. The output control unit varies an amount of light output from the backlight according to a polarization reverse current. When the polarization reverse current gets larger, the amount of light output from the backlight is decreased. When the polarization reverse current gets smaller, the amount of light output from the backlight is increased. The amounts of transmission light required for white display and black display by the ferroelectric liquid crystal panel having the structure shown in FIG. 11 were measured in relation to a change in temperature. The results of the measurement are identical to those graphically shown in FIG. 37. The amounts of transmission light do not depend on the temperature of use but remain substantially constant. Consequently, a different in contrast ratio for display between temperatures is resolved substantially. Satisfactory display quality is realized.

A ferroelectric liquid crystal unit having the structure shown in FIG. 12 is used for display. The results of measuring the amounts of transmission light required for white display and black display by a ferroelectric liquid crystal panel in relation to a change in temperature are identical to those graphically shown in FIG. 37. The amounts of transmission light do not depend on the temperature of use but remain substantially constant. A difference in contrast ratio for display between temperatures is substantially resolved. Satisfactory display quality is realized.

Moreover, according to any of the embodiments, sheet polarizers may be arranged so that a direction in which the major axis of an average molecule of a ferroelectric liquid crystal is oriented in either of ferroelectric states will be aligned with a plane of polarization produced by a sheet polarizer or with an intermediate plane. Nevertheless, good results are obtained.

According to this embodiment, a range of temperature of use is defined as a range from 10° C. to 40° C. The range of temperature of use is not limited to this range.

According to the first aspect of the present invention, there is provided an antiferroelectric liquid crystal unit in which a contrast ratio for display is devoid of temperature dependency irrespective of a temperature, and an amount of light output from a backlight can be adjusted with a small power consumption. At whatever temperature of use the liquid crystal unit is used, a satisfactory display can be achieved all the time.

According to the second aspect of the present invention, a structure making it possible to turn sheet polarizers at a desired angle is included. Owing to this structure, as long as a change in temperature is limited to a range permitting operations, an amount of transmission light for dark display can be optimized. A high contrast ratio for display can be attained. Otherwise, a decrease in contrast ratio for display occurs during dark display because of misalignment between the major axis of a molecule of an antiferroelectric liquid crystal or ferroelectric liquid crystal and a plane of polarization produced by a sheet polarizer. The misalignment is caused by a change in conical angle deriving from a change in temperature.

According to the third aspect of the present invention, a ferroelectric liquid crystal unit can attain a certain contrast ratio for display at a temperature within a range of temperature of use because first and second sheet polarizers can be arranged properly. Moreover, an amount of light output from a backlight can be adjusted. Consequently, at whatever temperature within a use temperature range the ferroelectric liquid crystal unit is used, satisfactory display quality can be attained all the time.

Industrial Applicability

As described so far, according to the present invention, there is provided an antiferroelectric liquid crystal unit having a liquid crystal panel in which an antiferroelectric liquid crystal is employed. In the antiferroelectric liquid crystal unit, despite a change in temperature of use, a change in contrast ratio for display will be limited, and a power consumption of a backlight will not increase. Moreover, there is provided a liquid crystal unit having a liquid crystal panel in which an antiferroelectric liquid crystal or ferroelectric liquid crystal is employed. In the liquid crystal unit, even when a change in conical angle of a liquid crystalline molecule occurs due to a change in temperature of use, sheet polarizers can be positioned so that a maximum contrast ratio can be attained at each use temperature. Furthermore, there is provided a ferroelectric liquid crystal unit having a liquid crystal panel in which a ferroelectric liquid crystal is employed. In the ferroelectric liquid crystal unit, despite a change in temperature of use, a change in contrast ratio for display will be limited and a power consumption of a backlight will not increase. Thus, a liquid crystal unit having a liquid crystal panel capable of offering good image quality and a backlight can be provided. The industrial applicability of the present invention covers a very wide range of fields.

What is claimed is:

1. An antiferroelectric liquid crystal unit having an antiferroelectric liquid crystal panel, which has an antiferroelectric liquid crystal sandwiched between a pair of substrates, and a backlight for illuminating said liquid crystal panel, wherein:

said antiferroelectric liquid crystal unit has a structure for adjusting an amount of light output from said backlight according to a change in polarization reverse current flowing through said antiferroelectric liquid crystal.

2. An antiferroelectric liquid crystal unit according to claim 1, wherein:

said antiferroelectric liquid crystal panel includes a polarization reverse current measuring device for measuring the polarization reverse current, and an amount-of-output light control unit for adjusting the amount of light output from said backlight; and said polarization reverse current measuring device and amount-of-output light control unit are electrically coupled and interlocked with each other.

3. An antiferroelectric liquid crystal unit according to claim 1, wherein:

said antiferroelectric liquid crystal panel is interposed between a pair of sheet polarizers, planes of polarization produced by said sheet polarizers are located at an angle of substantially 90°, and one of said planes of polarization produced by said sheet polarizers is aligned with a direction in which the major axis of an average molecule of said antiferroelectric liquid crystal is oriented in an antiferroelectric state; and the amount of light output from said backlight is adjusted so that: as the polarization reverse current gets larger, the amount of light output from said backlight will decrease; and as the polarization reverse current gets smaller, the amount of light output from said backlight will increase.

4. An antiferroelectric liquid crystal unit according to claim 1, wherein said polarization reverse current measuring device is an electrode placed on a substrate.

5. An antiferroelectric liquid crystal unit according to claim 4, wherein said electrode serving as said polarization reverse current measuring device is not the same as display electrodes necessary to display a screen.

6. A liquid crystal unit, comprising:

a liquid crystal panel having a liquid crystal, which assumes at least a first ferroelectric state and second ferroelectric state, sandwiched between a pair of substrates, and having a first sheet polarizer and second sheet polarizer;

said first sheet polarizer and second sheet polarizer being arranged to interpose said pair of substrates between them, a plane of polarization produced by said first sheet polarizer and a plane of polarization produced by said second sheet polarizer being fixed at an angle of substantially 90°, and said first sheet polarizer and second sheet polarizer sharing the same axis of rotation, a turning control unit for adjusting an angle of rotation with said axis of rotation, which is shared by said first sheet polarizer and second sheet polarizer, as a center according to a change in polarization reverse current flowing through said liquid crystal; and a polarization reverse current measuring device for measuring the polarization reverse current, said polarization reverse current measuring device and turning control unit being electrically coupled and interlocked with each other.

7. A liquid crystal unit according to claim 6, wherein said polarization reverse current measuring device is an electrode placed on a substrate.

8. A liquid crystal unit according to claim 7, wherein said electrode serving as said polarization reverse current measuring device is not the same as display electrodes necessary to display a screen.

9. A liquid crystal unit, comprising:

a liquid crystal panel having a liquid crystal, which assumes at least first and second ferroelectric states, sandwiched between a pair of substrates, the panel having a first sheet polarizer and second sheet polarizer arranged to interpose said pair of substrates between them, and having a plane of polarization produced by said first sheet polarizer and a plane of polarization produced by said second sheet polarizer fixed at an angle of 90°, wherein:

one of two planes located at angles that are halves of angles defined by said plane of polarization produced by said first sheet polarizer and said plane of polarization produced by said second sheet polarizer is regarded as a first intermediate plane, and the other thereof is regarded as a second intermediate plane; and said first and second sheet polarizers are arranged so that:

a direction in which the major axis of an average molecule of said liquid crystal is oriented in one of said first and second ferroelectric states will always be located between said plane of polarization produced by said first sheet polarizer and said first intermediate plane; and a direction in which the major axis of the average molecule of said liquid crystal is oriented in the other ferroelectric state will always be located between said plane of polarization produced by said second sheet polarizer and said first intermediate plane;

the locations of both said directions occurring at a temperature within a range of temperatures of use of said liquid crystal panel or a range of temperatures within which said liquid crystal panel is usable, and also at a minimum or a maximum temperature of use of said liquid crystal.

10. A liquid crystal unit, comprising:

a liquid crystal panel having a liquid crystal, which assumes at least first and second ferroelectric states, sandwiched between a pair of substrates, the panel having a first sheet polarizer and second sheet polarizer arranged to interpose said pair of substrates between them, and having a plane of polarization produced by said first sheet polarizer and a plane of polarization produced by said second sheet polarizer fixed at an angle of 90°, wherein:

one of two planes located at angles that are halves of angles defined by said plane of polarization produced by said first sheet polarizer and said plane of polarization produced by said second sheet polarizer is regarded as a first intermediate plane, and the other thereof is regarded as a second intermediate plane; and said first and second sheet polarizers are arranged so that:

a direction in which the major axis of an average molecule of said liquid crystal is oriented in one of said first and second ferroelectric states will always be located between said plane of polarization produced by said second sheet polarizer and said first intermediate plane; and a direction in which the major axis of the average molecule of said liquid crystal is oriented in the other ferroelectric state will always be located between said plane of polarization produced by said second sheet polarizer and said second intermediate plane;

the locations of both said directions occurring at a temperature within a range of temperatures of use of said liquid crystal panel or a range of temperatures within which said liquid crystal panel is usable, and also at a minimum or a maximum temperature of use of said liquid crystal.

11. A liquid crystal unit, comprising:

a liquid crystal panel having a liquid crystal, which assumes at least first and second ferroelectric states, sandwiched between a pair of substrates, the panel having a first sheet polarizer and second sheet polarizer arranged to interpose said pair of substrates between them, and having a plane of polarization produced by said first sheet polarizer and a plane of polarization produced by said second sheet polarizer fixed at an angle of 90°, wherein:

one of two planes located at angles that are halves of angles defined by said plane of polarization produced by said first sheet polarizer and said plane of polarization produced by said second sheet polarizer is regarded as a first intermediate plane, and the other thereof is regarded as a second intermediate plane; and said first and second sheet polarizers are arranged so that:

a direction in which the major axis of an average molecule of said liquid crystal is oriented in one of said first and second ferroelectric states will always be located between said plane of polarization produced by said first sheet polarizer and said first intermediate plane; and a direction in which the major axis of the average molecule of said liquid crystal is oriented in the other ferroelectric state will always be located between said plane of polarization produced by said first sheet polarizer and said second intermediate plane;

the locations of both said directions occurring at a temperature within a range of temperatures of use of said liquid crystal panel or a range of temperatures within which said liquid crystal panel is usable, and at a minimum or a maximum temperature of use of said liquid crystal.

12. A liquid crystal unit according to any one of claims 9, 10, or 11, wherein said liquid crystal is ferroelectric liquid crystal or antiferroelectric liquid crystal.

13. A liquid crystal unit according to any one of claims 9, 10, or 11, wherein said liquid crystal unit comprises a backlight for illuminating said liquid crystal panel, said liquid crystal unit further comprising:

a structure for adjusting an amount of light output from said backlight according to a change in angle defined between the direction in which the major axis of the average molecule of said liquid crystal is oriented in one of first and second ferroelectric states, and the direction in which the major axis of the average molecule of said liquid crystal is oriented in the other ferroelectric state.

14. A liquid crystal unit according to claim 9, wherein said liquid crystal unit comprises a backlight for illuminating said liquid crystal panel, and the amount of light output from said backlight is adjusted so that:

as an angle defined between the direction in which the major axis of the average molecule of said liquid crystal is oriented in one of said first and second ferroelectric states, and the direction in which the major axis of the average molecule of said liquid crystal is oriented in the other ferroelectric state gets smaller, the amount of light output from said backlight will decrease; and as the angle defined between the direction in which the major axis of the average molecule of said liquid crystal is oriented in one of said first and second ferroelectric states, and the direction in which the major axis of the average molecule of said liquid crystal is oriented in the other ferroelectric state gets larger, the amount of light output from said backlight will increase.

15. A liquid crystal unit according to either of claims 10 or 11, wherein said liquid crystal unit comprises a backlight for illuminating said liquid crystal panel, and the amount of light output from said backlight is adjusted so that:

as an angle defined between the direction in which the major axis of the average molecule of said liquid crystal is oriented in one of said first and second ferroelectric states, and the direction in which the major axis of the average molecule of said liquid crystal is oriented in the other ferroelectric state gets smaller, the amount of light output from said backlight will increase; and as the angle defined between the direction in which the major axis of the average molecule of said liquid crystal is oriented in one of said first and second ferroelectric states, and the direction in which the major axis of the average molecule of said liquid crystal is oriented in the other ferroelectric state gets larger, the amount of light output from said backlight will decrease.

16. A liquid crystal unit according to any one of claims 9, 10, or 11, wherein said liquid crystal unit comprises: a backlight for illuminating said liquid crystal panel; and a structure for adjusting an amount of light output from said backlight according to a change in temperature of use of said liquid crystal panel or a change in temperature at which said liquid crystal panel is usable.

17. A liquid crystal unit according to claim 9, wherein said liquid crystal unit comprises a backlight for illuminating said liquid crystal panel, and the amount of light output from said backlight is adjusted so that: as the temperature of said liquid crystal panel rises, the amount of light output from said backlight will decrease; and as the temperature of said liquid crystal panel drops, the amount of light output from said backlight will increase.

18. A liquid crystal unit according to either of claims 10 or 11, wherein said liquid crystal unit comprises a backlight for illuminating said liquid crystal panel, and the amount of light output from said backlight is adjusted so that: as the temperature of said liquid crystal panel rises, the amount of light output from said backlight will increase; and as the temperature of said liquid crystal panel drops, the amount of light output from said backlight will decrease.

19. A liquid crystal unit according to claim 16, wherein: said liquid crystal panel includes a temperature sensor for detecting a change in the temperature of use, and an amount-of-output light control unit for adjusting an amount of light output from said backlight; and said temperature sensor and amount-of-output light control unit are electrically coupled and interlocked with each other.

20. A liquid crystal unit according to claim 19, wherein a temperature sensor for sensing a change in temperature occurring in said liquid crystal panel is placed on a substrate.

21. A liquid crystal unit according to claim 9, wherein said liquid crystal unit comprises a backlight for illuminating said liquid crystal panel, and the amount of light output from said backlight is adjusted so that: as the polarization reverse current flowing through said liquid crystal panel gets larger, the amount of light output from said backlight will increase; and as the polarization reverse current flowing through said liquid crystal panel gets smaller, the amount of light output from said backlight will decrease.

22. A liquid crystal unit according to either of claims 10 or 11, wherein said liquid crystal unit comprises a backlight for illuminating said liquid crystal panel, and the amount of light output from said backlight is adjusted so that: as the polarization reverse current flowing through said liquid crystal panel gets larger, the amount of light output from said backlight will decrease; and as the polarization reverse current flowing through said liquid crystal panel gets smaller, the amount of light output from said backlight will increase.

23. A ferroelectric liquid crystal unit having a ferroelectric liquid crystal panel that has a ferroelectric liquid crystal sandwiched between a pair of substrates, and a backlight for illuminating said liquid crystal panel, wherein:

said ferroelectric liquid crystal unit has a structure for adjusting an amount of light output from said backlight according to a change in polarization reverse current flowing through said ferroelectric liquid crystal.

24. A ferroelectric liquid crystal unit according to claim 23 wherein: said ferroelectric liquid crystal panel includes a polarization reverse current measuring device for measuring a polarization reverse current, and an amount-of-output light control unit for adjusting an amount of light output from said backlight; and said polarization reverse current measuring device and amount-of-output light control unit are electrically coupled and interlocked with each other.

25. A ferroelectric liquid crystal unit according to claim 24, wherein said polarization reverse current measuring device is an electrode placed on a substrate.

26. A ferroelectric liquid crystal unit according to claim 25, wherein said electrode serving as said polarization reverse current measuring device is not the same as display electrodes necessary to display a screen.

* * * * *